United States Patent
Lee et al.

(10) Patent No.: US 12,368,380 B2
(45) Date of Patent: Jul. 22, 2025

(54) DC-DC CONVERTER AND DISPLAY DEVICE INCLUDING THE SAME

(71) Applicants: Samsung Display Co., Ltd., Yongin-Si (KR); UNIST (ULSAN NATIONAL INSTITUTE OF SCIENCE AND TECHNOLOGY), Ulsan (KR)

(72) Inventors: Hyo Chul Lee, Yongin-si (KR); Franklindon Bien, Ulsan (KR); Ji Won Kim, Yongin-si (KR); Seung In Baek, Yongin-si (KR); In Soo Wang, Yongin-si (KR); Woo Jin Park, Ulsan (KR)

(73) Assignees: Samsung Display Co., Ltd., Yongin-si (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 18/736,863

(22) Filed: Jun. 7, 2024

(65) Prior Publication Data
US 2025/0079985 A1 Mar. 6, 2025

(30) Foreign Application Priority Data
Aug. 30, 2023 (KR) .......................... 10-2023-0114860

(51) Int. Cl.
*H02M 3/158* (2006.01)
*G09G 3/3233* (2016.01)
(Continued)

(52) U.S. Cl.
CPC .......... *H02M 3/158* (2013.01); *G09G 3/3233* (2013.01); *H02M 1/08* (2013.01);
(Continued)

(58) Field of Classification Search
None
See application file for complete search history.

(56) References Cited

U.S. PATENT DOCUMENTS

| 8,988,136 B2 * | 3/2015 | Yoon | H02M 3/07 |
| | | | 327/536 |
| 2013/0093407 A1 * | 4/2013 | Heo | H02M 3/156 |
| | | | 323/290 |

(Continued)

FOREIGN PATENT DOCUMENTS

KR 10-1998078 B1 7/2019

OTHER PUBLICATIONS

Tzung-Je Lee et al., "High efficiency buck converter with wide load current range using dual-mode of PWM and PSM", IEEE International Symposium on Circuits and Systems, 978-1-7281-0397-6, May 1, 2019.

(Continued)

*Primary Examiner* — Christopher J Kohlman
(74) *Attorney, Agent, or Firm* — Innovation Counsel LLP

(57) ABSTRACT

According to embodiments of the disclosure, a DC-DC converter includes a voltage generator configured to generate an output voltage by converting an input voltage, a first mode driver configured to generate a first switching signal to drive the voltage generator in a first mode, a second mode driver configured to generate a second switching signal to drive the voltage generator in a second mode, a third mode driver configured to generate a third switching signal to drive the voltage generator in a third mode, and a mode controller configured to determine an output load of the voltage generator using the first switching signal, the second switching signal, and the third switching signal, and supply (Continued)

one of the first switching signal, the second switching signal, and the third switching signal to the voltage generator according to the output load.

37 Claims, 22 Drawing Sheets

(51) Int. Cl.
 *H02M 1/08* (2006.01)
 *H02M 3/157* (2006.01)
(52) U.S. Cl.
 CPC .... *H02M 3/157* (2013.01); *G09G 2300/0819* (2013.01); *G09G 2300/0842* (2013.01); *G09G 2300/0861* (2013.01); *G09G 2310/08* (2013.01); *G09G 2330/02* (2013.01)

(56) References Cited

U.S. PATENT DOCUMENTS

| | | | |
|---|---|---|---|
| 2016/0172989 A1* | 6/2016 | Lee | H02H 3/247 363/21.02 |
| 2019/0190377 A1* | 6/2019 | Santiago | H02M 3/156 |
| 2021/0351753 A1* | 11/2021 | Bowlerwell | G06F 1/189 |
| 2022/0247312 A1* | 8/2022 | Ihs | H02M 3/157 |
| 2024/0097570 A1* | 3/2024 | Matsumoto | H02M 3/157 |

OTHER PUBLICATIONS

Seong Joong Kim et al., "A 10-MHz 2-800-mA 0.5-1.5-V 90% peak efficiency time-based buck converter with seamless transition between PWM/PFM modes", IEEE Journal of Solid-State Circuits, vol. 53, Issue 3, pp. 814-824, Mar. 2018.

Young-Jun Park et al., "A design of a 92.4% efficiency triple mode control dc-dc buck converter with low power retention mode and adaptive zero current detector for IoT/wearable applications", IEEE Transactions on Power Electronics, vol. 32, Issue 9, Sep. 2017.

Wan-Rone Liou et al., "A high efficiency dual-mode buck converter IC for portable applications", IEEE Transactions on Power Electronics, vol. 23, Issue 2, pp. 667-677, Mar. 5, 2008.

Woojin Hong et al., "A 7.4-MHz tri-mode DC-DC buck converter with load current prediction scheme and seamless mode transition for IoT applications", IEEE Transactions on Circuits and Systems I: Regular Papers, vol. 67, Issue 12, pp. 4544-4555, Dec. 2020.

Po-Hung Chen et al., "A 50 nW-to-10 mW output power tri-mode digital buck converter with self-tracking zero current detection for photovoltaic energy harvesting," IEEE Journal of Solid-State Circuits, vol. 51, Issue 2, pp. 523-532, Feb. 2016.

Menglian Zhao et al. "An Ultra-Low Quiescent Current Tri-Mode DC-DC Buck Converter With 92.1% Peak Efficiency for IoT Applications", IEEE Transactions on Circuits and Systems I: Regular Papers, vol. 69, Issue 1, pp. 428-439, Jan. 2022.

* cited by examiner

DC-DC CONVERTER AND DISPLAY DEVICE INCLUDING THE SAME

This application claims priority to Korean Patent Application No. 10-2023-0114860, filed on Aug. 30, 2023, and all the benefits accruing therefrom under 35 U.S.C. § 119, the content of which in its entirety is herein incorporated by reference.

BACKGROUND

1. Field

The disclosure relates to a DC-DC converter and a display device including the same.

2. Description of the Related Art

A display device includes a DC-DC converter that generates high-potential power and low-potential power required to drive pixels by converting an input voltage supplied from an outside.

SUMMARY

A DC-DC converter may be driven in various driving methods (for example, a PWM method and a PFM method) in response to an output load (or a load current). In order to sense the output load of the DC-DC converter, a sensing circuit including a resistor and the like may be added, and thus power consumption, the mounting area, and the like may be increased.

An object of the disclosure is to provide a DC-DC converter and a display device including the same capable of determining the output load (or the load current) using a plurality of switching signals corresponding to the driving method of the DC-DC converter and controlling the driving method of the DC-DC converter in response to the determined output load.

According to embodiments of the disclosure, a DC-DC converter includes a voltage generator configured to generate an output voltage by converting an input voltage, a first mode driver configured to generate a first switching signal to drive the voltage generator in a first mode, a second mode driver configured to generate a second switching signal to drive the voltage generator in a second mode, a third mode driver configured to generate a third switching signal to drive the voltage generator in a third mode, and a mode controller configured to determine an output load of the voltage generator using the first switching signal, the second switching signal, and the third switching signal, and supply one of the first switching signal, the second switching signal, and the third switching signal to the voltage generator according to the output load.

According to an embodiment, the first mode is a PWM mode, the second mode is a PFM mode, and the third mode is a ULP mode that generates the third switching signal having a frequency lower than that of the second switching signal.

According to an embodiment, the DC-DC converter further includes a first switch connected between the first mode driver and the voltage generator and turned on when an enable first control signal is supplied from the mode controller, a second switch connected between the second mode driver and the voltage generator and turned on when an enable second control signal is supplied from the mode controller, and a third switch connected between the third mode driver and the voltage generator and turned on when an enable third control signal is supplied from the mode controller.

According to an embodiment, the voltage generator includes an inductor connected between an input terminal to which the input voltage is supplied and an output terminal through which the output voltage is output, a first transistor connected between the input terminal and the inductor, turned on in an on-time period of the first switching signal, the second switching signal, or the third switching signal, and turned off in an off-time period, a second transistor connected between a ground potential and a common node between the first transistor and the inductor, a driver configured to control turn-on and turn-off of the first transistor and the second transistor by receiving one of the first switching signal, the second switching signal, and the third switching signal, and a plurality of resistors connected in series between the output terminal and the ground potential, and a feedback voltage is output from a node between the plurality of resistors.

According to an embodiment, the mode controller includes an on-time checker configured to check the on-time period of the first switching signal to generate an on-time control signal, an off-time checker configured to check the off-time period of the second switching signal to generate an off-time control signal, a first counter configured to count the second switching signal to generate a first count signal when the feedback voltage is set to a voltage lower than a reference voltage in the second mode driver, and a second counter configured to count the third switching signal to generate a second count signal when the feedback voltage is set to a voltage lower than the reference voltage in the third mode driver.

According to an embodiment, the on-time checker is driven when the voltage generator is driven in the first mode, generates an enable on-time control signal when the on-time period of the first switching signal is greater than or equal to a predetermined time, and generates a disable on-time control signal when the on-time period of the first switching signal is less than the predetermined time.

According to an embodiment, when the enable on-time control signal is generated by the on-time checker, the voltage generator maintains driving of the first mode, and when the disable on-time control signal is generated by the on-time checker, the voltage generator is driven in the second mode.

According to an embodiment, the on-time checker includes a current supply configured to generate a plurality of currents, a current controller including a plurality of resistors for distributing the input voltage, a current selector configured to control a current amount supplied from the current supply to a first node according to control of the current controller, a reset unit configured to initialize the first node in response to an inverted first switching signal, and an on-time control signal generator configured to generate the on-time control signal according to a voltage of the first node.

According to an embodiment, the current supply includes a control transistor connected between a first power source and a current source, and a plurality of mirror transistors connected between the first power source and the first node, a gate electrode of each of the plurality of mirror transistors is connected to a gate electrode of the control transistor and supplying the plurality of currents to the current selector.

According to an embodiment, the current controller includes the plurality of resistors connected in series to distribute the input voltage and generating a plurality of distribution voltages by distributing the input voltage, and a plurality of comparators each configured to compare one of the distribution voltages with a comparison voltage and output a control voltage according to a comparison result.

According to an embodiment, the current selector comprises a plurality of current transistors each connected between the first node and one of the mirror transistors, and turned on or turned off by the control voltage, and one of the plurality of currents supplied from the current selector is directly supplied to the first node.

According to an embodiment, the reset unit includes a first transistor and a second transistor connected in series between a first power source and the ground potential, and a third transistor connected between the first node and the ground potential, and having a gate electrode connected to a common node of the first transistor and the second transistor, the first transistor is a P type transistor, the second transistor is an N type transistor, the third transistor is an N type transistor, and the inverted first switching signal is supplied to a gate electrode of the first transistor and a gate electrode of the second transistor.

According to an embodiment, the on-time control signal generator includes a first capacitor connected between the first node and the ground potential, a first transmission gate connected between the first node and a second node, a second capacitor connected between the second node and the ground potential, a second transmission gate connected between the second node and a third node, a third capacitor connected between the third node and the ground potential, and a comparator configured to compare voltages of first reference power and the third node to output the on-time control signal.

According to an embodiment, the first transmission gate electrically connects the first node and the second node in response to the first switching signal and the inverted first switching signal, and the second transmission gate electrically connects the second node and the third node while being alternately turned on and turned off with the first transmission gate in response to the inverted first switching signal and the first switching signal.

According to an embodiment, the off-time checker is driven when the voltage generator is driven in the second mode, generates an enable off-time control signal when the off-time period of the second switching signal is less than a predetermined time, and generates a disable off-time control signal when the off-time period of the second switching signal is greater than or equal to the predetermined time.

According to an embodiment, when the enable off-time control signal is generated by the off-time checker, the voltage generator maintains driving of the second mode, and when the disable off-time control signal is generated by the off-time checker, the voltage generator is driven in the third mode.

According to an embodiment, the off-time checker includes a current supply configured to supply a predetermined current to a first node, a reset unit configured to initialize the first node in response to the first switching signal, a controller configured to control a voltage of a second node in response to a voltage of the first node, and a first output unit configured to generate the off-time control signal in response to a voltage of the second node.

According to an embodiment, the current supply includes a control transistor connected between a first power source and a current source, and a mirror transistor connected to the control transistor in a current mirror to supply the predetermined current to the first node.

According to an embodiment, the controller includes a fourth transistor connected between the second node and the ground potential, and having a gate electrode connected to the first node, a fifth transistor connected between the first power source and the second node, and having a gate electrode connected between the first power source and the first node, a gate electrode of the mirror transistor being connected a gate electrode of a gate electrode of the control transistor, and a first capacitor connected between the first node and the ground potential.

According to an embodiment, the reset unit includes a first transistor and a second transistor connected in series between a first power source and the ground potential, and a third transistor connected between the first node and the ground potential, and having a gate electrode connected to a common node of the first transistor and the second transistor, the first transistor is a P type transistor, the second transistor is an N type transistor, the third transistor is an N type transistor, and the second switching signal is supplied to a gate electrode of the first transistor and a gate electrode of the second transistor.

According to an embodiment, the first output unit includes a sixth transistor and a seventh transistor connected in series between a first power source and a ground potential, and each having a gate electrode connected to the second node, and a D flip-flop having a clock input connected to a common node between the sixth transistor and the seventh transistor, a QB terminal of the D flip-flop is connected to a D terminal, a signal output from a Q terminal is the off-time control signal, the sixth transistor is a P type transistor, and the seventh transistor is an N type transistor.

According to an embodiment, the off-time checker further includes a second output unit generating an on-time change signal in response to a voltage of the first node to control an on-time of the second switching signal.

According to an embodiment, the second output unit includes a first transmission gate connected between the first node and a fourth node, a second capacitor connected between the fourth node and the ground potential, a second transmission gate connected between the fourth node and a second output terminal through which the on-time change signal is output, and a third capacitor connected between the second output terminal and the ground potential.

According to an embodiment, the first counter is driven when the voltage generator is driven in the second mode, the first counter generates a disable first count signal when the feedback voltage is a voltage higher than a reference voltage, and generates an enable first count signal when the feedback voltage is a voltage lower than the reference voltage in the second mode driver and the second switching signal is supplied repeatedly by a predetermined number of times or more.

According to an embodiment, when the disable first count signal is generated, the voltage generator maintains driving of the second mode, and when the enable first count signal is generated, the voltage generator is driven in the first mode.

According to an embodiment, the first counter includes a k (k is a natural number) bit counter, an output unit configured to generate the enable first count signal when a count signal is input from the k bit counter, a first logic gate configured to receive the second control signal and a power signal which is a high voltage when an output voltage of the DC-DC converter is greater than or equal to a target voltage, a second logic gate configured to invert an output of the first logic gate, and a third logic gate configured to perform a logical operation on an output of the second logic gate and the second switching signal and supply an output to the k bit counter.

According to an embodiment, the first logic gate is a NAND gate, the second logic gate is a NOT gate, the third logic gate is an AND gate, and an output of the first logic gate is input to the k bit counter as a reset signal.

According to an embodiment, the output unit is set to a D flip-flop, and the output unit is initialized when a reset signal is supplied from the mode controller.

According to an embodiment, the second counter is driven when the voltage generator is driven in the third mode, when the feedback voltage is a voltage higher than a reference voltage in the third mode driver, a disable second count signal is generated, and when the feedback voltage is a voltage lower than the reference voltage in the third mode driver and the third switching signal is supplied repeatedly for a predetermined number of times or more, an enable second count signal is generated.

According to an embodiment, when the disable second count signal is generated, the voltage generator maintains driving of the third mode, and when the enable second count signal is generated, the voltage generator is driven in the second mode. According to an embodiment, the second counter includes p (p is a natural number) bit counter, an output unit configured to generate the enable second count signal when a count signal is input from the p bit counter, a first logic gate configured to receive the third control signal and a power signal which is a high voltage when an output voltage of the DC-DC converter is greater than or equal to a target voltage, a second logic gate configured to invert an output of the first logic gate, and a third logic gate configured to perform a logical operation on an output of the second logic gate and the third switching signal to supply an output to the p bit counter.

According to an embodiment, the first logic gate is a NAND gate, the second logic gate is a NOT gate, the third logic gate is an AND gate, and an output of the first logic gate is input to the p bit counter as a reset signal.

According to an embodiment, the output unit is a D flip-flop, and the output unit is initialized when a reset signal is supplied from the mode controller.

According to an embodiment, the mode controller further includes a first logic gate configured to perform a logical operation on the on-time control signal and the first count signal, a second logic gate configured to perform a logical operation on an output of the first logic gate and an inverted power signal which is a high voltage when an voltage of the DC-DC converter is greater than or equal to a target voltage, a third logic gate configured to perform a logical operation on an output of the second logic gate and the off-time control signal, a fourth logic gate configured to perform a logical operation on an output of the third logic gate and the second count signal, a fifth logic gate configured to perform a logical operation on an inverted off-time control signal and an output of the second logic gate, and a sixth logic gate configured to invert the off-time control signal to generate the inverted off-time control signal.

According to an embodiment, the first logic gate, the second logic gate, and the fourth logic gate are OR gates, the third logic gate and the fifth logic gate are NOR gates, and the sixth logic gate is a NOT gate.

According to an embodiment, the output of the second logic gate is the first control signal, an output of the fourth logic gate is the second control signal, and an output of the fifth logic gate is the third control signal.

According to embodiments of the disclosure, a display device includes pixels connected to scan lines and data lines, and a power supply including a DC-DC converter to supply driving power required for the pixels, and the DC-DC converter includes a voltage generator configured to generate an output voltage by converting an input voltage, a first mode driver configured to generate a first switching signal to drive the voltage generator in a first mode, a second mode driver configured to generate a second switching signal to drive the voltage generator in a second mode, a third mode driver configured to generate a third switching signal to drive the voltage generator in a third mode, and a mode controller configured to determine an output load of the voltage generator using the first switching signal, the second switching signal, and the third switching signal, and supply one of the first switching signal, the second switching signal, and the third switching signal to the voltage generator according to the output load.

Objects of the disclosure are not limited to the object described above, and other technical objects which are not described will be clearly understood by those skilled in the art from the following description.

In accordance with the DC-DC converter and the display device including the same according to embodiments of the disclosure, the output load may be determined using a switching signal generated from the mode drivers, and a driving method of the DC-DC converter may be controlled in response to the determined output load.

However, an effect of the disclosure is not limited to the above-described effect, and may be variously extended within a range that does not deviate from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
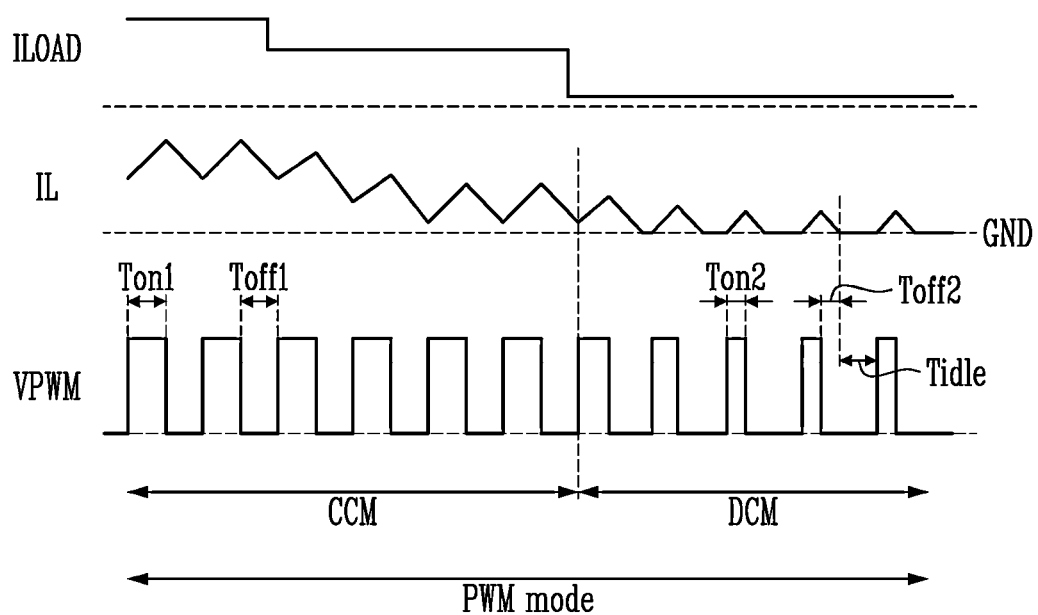
FIG. 1 is a diagram schematically illustrating a PWM mode of a DC-DC converter.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, since a size and a thickness of each configuration shown in the drawings are arbitrarily shown for convenience of description, the disclosure is not necessarily limited to that shown in the drawings. In order to clearly express multiple layers and areas in the drawing, a thickness may be exaggerated.

In addition, an expression "is the same" in the description may mean "is substantially the same." That is, the expression "is the same" may be the same enough for those of ordinary skill to understand that it is the same. Other expressions may also be expressions in which "substantially" is omitted.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

A term "connection" between two configurations may mean that both of an electrical connection and a physical connection are used inclusively, but is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the disclosure. The singular expression includes the plural expression unless the context clearly dictates otherwise.

Meanwhile, the disclosure is not limited to the embodiments disclosed below, and may be modified in various forms and may be implemented. In addition, each of the embodiments disclosed below may be implemented alone or in combination with at least one of other embodiments.

FIG. 1 is a diagram schematically illustrating a Pulse-width modulation (PWM) mode of a DC-DC converter. In FIG. 1, ILOAD may refer to an output load (or a load current). For example, when the DC-DC converter is included in a display device, the output load ILOAD (or the load current) may be set differently to correspond to an image displayed on the display device.

In FIG. 1, IL may refer to a current of an inductor (for example, L of FIG. 3) included in the DC-DC converter. In FIG. 1, VPWM may refer to a switching signal for controlling a current supplied to the inductor. In FIG. 1, it is assumed that the current is supplied to the inductor during a high period Ton1 and Ton2 of the switching signal VPWM (that is, an on-time period), and the current is not supplied to the inductor during a low period Toff1 and Toff2 (that is, an off-time period).

Referring to FIG. 1, the PWM mode may include a continuous conduction mode CCM and a discontinuous conduction mode DCM.

In PWM mode, the switching signal VPWM may operate with a fixed switching frequency. However, a duty of the switching signal VPWM may be adjusted in response to a CCM method and a DCM method.

When the inductor current IL exceeds "0" which is a ground potential GND, the DC-DC converter may be driven in the CCM method. In the CCM method, the switching signal VPWM may repeat on-off at a predetermined cycle. Then, the current IL of the inductor may increase and decrease at the predetermined cycle, and thus an output voltage of a DC-DC converter may be generated. In the CCM method, the current IL of the inductor may change continuously at the predetermined cycle. The CCM method may have high output stability because the inductor minimizes an output ripple.

When the inductor current IL includes "0" which is the ground potential GND, the DC-DC converter may be driven in the DCM method. In the DCM method, a discontinuous period Tidle in which transistors (for example, Mp and Mn shown in FIG. 3) for supplying the current to the inductor are simultaneously turned off may be included. A peak value of the inductor current IL in the DCM method may be less than a peak value of the inductor current IL in the CCM method. A duty (that is, an on-time period) of the switching signal VPWM in the DCM method may be less than that in the CCM method. The DCM method may have power consumption lower than that in the CCM method.

When the DC-DC converter is driven in the PWM mode, the DC-DC converter may be driven in the CCM method when the output load ILOAD is high, and may be driven in the DCM method when the output load ILOAD is low.

Meanwhile, as described above, when the DC-DC converter is driven in the DCM method, the on-time period of the switching signal VPWM may be reduced, and thus the output load ILOAD (or the load current) may be determined using the on-time period of the switching signal VPWM.

Figure 2:
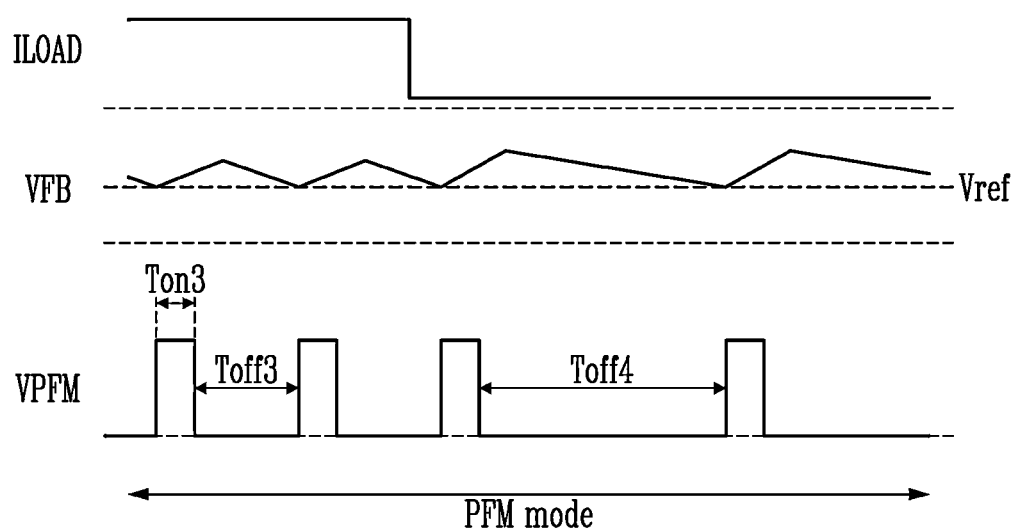
FIG. 2 is a diagram schematically illustrating a PFM mode of the DC-DC converter.

FIG. 2 is a diagram schematically illustrating a Pulse Frequency Modulation (PFM) mode of the DC-DC converter. In FIG. 2, ILOAD may refer to an output load. In FIG. 2, VFB (refer to FIG. 3) may refer to a feedback voltage generated by distributing an output voltage Vout. In FIG. 2, it is assumed that the current is supplied to the inductor during a high period Ton3 of the switching signal VPFM, and the current is not supplied to the inductor during low periods Toff3 and Toff4.

Referring to FIG. 2, in the PFM mode, a frequency of the switching signal VPFM may be changed in response to the output load ILOAD. For example, when the output load ILOAD is relatively low, the frequency of the switching signal VPFM may be decreased to decrease the number of switching times of the transistors (for example, Mp and Mn shown in FIG. 3) to supply the current to the inductor. When the frequency of the switching signal VFPM is changed in response to the output load ILOAD, power consumption may be reduced.

In the PFM mode, off periods Toff3 and Toff4 when the current is not supplied to the inductor are set differently in response to the output load ILOAD. Therefore, in the PFM mode, the output load ILOAD (or a load current level) may be determined using the off periods Toff3 and Toff4 (that is, an off-time period).

Figure 3:
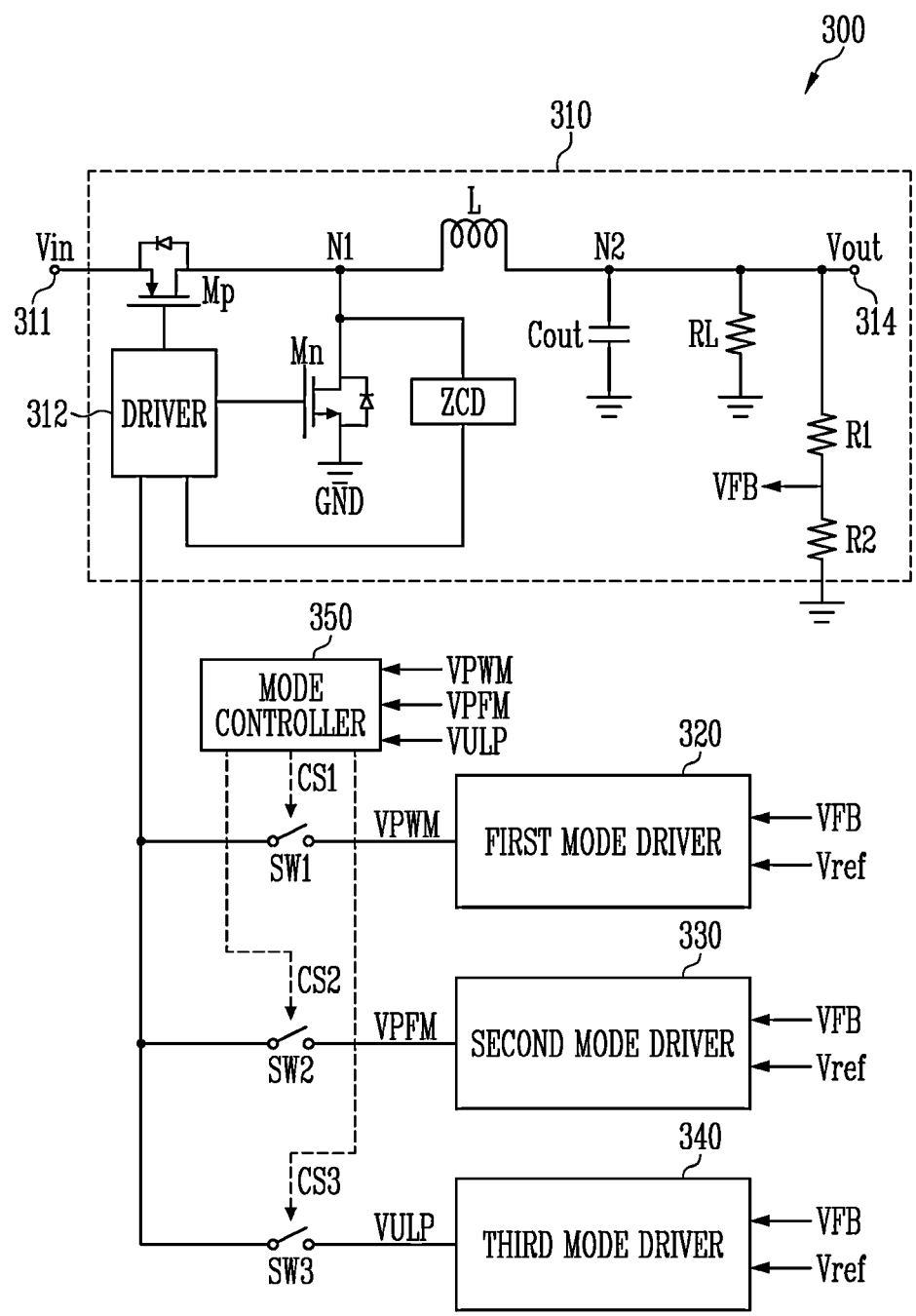
FIG. 3 is a diagram illustrating a DC-DC converter according to an embodiment of the disclosure.

FIG. 3 is a diagram illustrating a DC-DC converter according to an embodiment of the disclosure.

Referring to FIG. 3, the DC-DC converter 300 according to an embodiment of the disclosure may include a voltage generator 310, a first mode driver 320, a second mode driver 330, a third mode driver 340, and a mode controller 350.

The voltage generator 310 may generate the output voltage Vout using an input voltage Vin. For example, the voltage generator 310 may generate the output voltage Vout in response to one of switching signals among a first switching signal VPWM supplied from the first mode driver 320, a second switching signal VPFM supplied from the second mode driver 330, and a third switching signals VULP supplied from the third mode driver 340.

The voltage generator 310 may be a buck converter. The voltage generator 310 may include the transistors Mp and Mn, a driver 312, the inductor L, a capacitor Cout, an output resistor RL, distribution resistors R1 and R2, and a zero current sensor ZCD.

A first transistor Mp may be connected between an input terminal 311 and a first node N1. Here, the meaning of being connected may include the meaning of being electrically connected. The first transistor Mp may be turned on during an enable period of a switching signal supplied from the driver 312. The first transistor Mp may be formed as a P-type transistor, and thus the enable period of the switching signal may be a low voltage supply period. When the first transistor Mp is turned on, the current may be supplied to the inductor L.

A second transistor Mn may be connected between the first node N1 and the ground potential GND. The second transistor Mn may be turned on during a disable period of the switching signal supplied from the driver 312. The second transistor Mn may be formed as an N-type transistor, and thus the disable period of the switching signal may be a high voltage supply period. When the second transistor Mn is turned on, the current is not supplied to the inductor L.

The driver 312 may drive the first transistor Mp and the second transistor Mn using one of switching signals among the first switching signal VPWM, the second switching signal VPFM, and the third switching signal VULP. The driver 312 may include a plurality of inverters and the like so that the first transistor Mp and the second transistor Mn may be stably turned on and turned off.

The inductor L is connected between the first node N1 and the second node N2. The inductor L stores energy in response to a current supplied from the input voltage Vin when the first transistor Mp is turned on. The inductor L may supply the current to an output terminal 314 based on the stored energy when the second transistor Mb is turned on. Since current is not supplied from the input voltage Vin to the inductor L when the first transistor Mp is turned off, the current supplied from the inductor L to the output terminal 314 may gradually decrease. That is, a voltage (or the current) supplied to the output terminal 314 by the inductor L may be controlled by a frequency, a duty ratio, and/or the like of the switching signal supplied from the driver 312 to the transistors Mp and Mn.

The capacitor Cout may be connected between the second node N2 (that is, the output terminal) and the ground potential GND. The capacitor Cout may store a voltage of the second node N2.

The output resistor RL may be connected between the second node N2 (that is, the output terminal) and the ground potential GND. The output resistor RL may be equivalent circuit of the output load.

The distribution resistors R1 and R2 may be connected in series between the second node N2 (that is, the output terminal) and the ground potential GND. The distribution resistors R1 and R2 may distribute the output voltage Vout to generate a feedback voltage VFB. For example, the feedback voltage VFB may be a voltage at a common node disposed between the distribution resistors R1 and the distribution resistors R2. The feedback voltage VFB may be supplied to the mode drivers 320, 330, and 340.

The zero current sensor ZCD may sense a time point when the inductor current is 0 and generate and supply a zero signal to the driver 312. The driver 312 may turn off the second transistor Mn when the zero signal is input, thereby preventing a reverse current flowing from the first node N1 to the ground potential GND.

The first mode driver 320 receives the feedback voltage VFB and a reference voltage Vref. The first mode driver 320 may output the first switching signal VPWM which corresponds to the PWM method. When the output load is greater than or equal to a first load, the first switching signal VPWM may be supplied to the driver 312 by the mode controller 350. The first mode driver 320 generating the first switching signal VPWM may have one of currently well-known configurations.

The second mode driver 330 receives the feedback voltage VFB and the reference voltage Vref. The second mode driver 320 may output the second switching signal VPFM which corresponds to the PFM method. When the output load is lower than the first load and higher than or equal to a second load, the second switching signal VPFM may be supplied to the driver 312 by the mode controller 350. The second mode driver 330 generating the second switching signal VPFM may have one of currently well-known configurations.

The third mode driver 340 receives the feedback voltage VFB and the reference voltage Vref. The third mode driver 320 may output the third switching signal VULP which corresponds to an ultra-low power (ULP) method. When the output load is lower than the second load, the third switching signal VULP may be supplied to the driver 312 by the mode controller 350. The third mode driver 340 generating the third switching signal VULP may have one of currently well-known configurations.

The ULP method may be a method of increasing the output voltage Vout by supplying the enable third switching signal VULP only when the output voltage Vout is decreased to a voltage less than or equal to a predetermined voltage. Here, the enable third switching signal VULP may mean that a voltage that turns on the first transistor Mp is supplied (for example, a low voltage).

The PWM method may be a method that may stably generate the output voltage Vout and may be applied when it has a high output load, for example, greater than or equal to the first load. The PFM method may be a method that may reduce power consumption compared to the PWM method and may be applied when it has an approximately medium output load, for example, less than the first load and greater than the second load. The third switching signal VULP generated in the ULP method may have a frequency lower than that of the second switching signal VPFM, and thus may be applied when it has a low output load, for example, less than or equal to the second load. The mode controller 350 receiving the switching signals VPWM, VPFM, and VULP may determine the output load using the switching signals VPWM, VPFM, and VULP. The mode controller 350 may supply any one of the first switching signal VPWM, the second switching signal VPFM, and the third switching signal VULP to the driver 312 according to the determined output load.

To this end, the DC-DC converter 300 may include a first switch SW1, a second switch SW2, and a third switch SW3.

The first switch SW1 may be connected between the driver 312 and the first mode driver 320. The first switch SW1 may be turned on when an enable first control signal CS1 (for example, a high voltage) is supplied from the mode controller 350, to electrically connect the driver 312 and the first mode driver 320.

The second switch SW2 may be connected between the driver 312 and the second mode driver 330. The second switch SW2 may be turned on when an enable second control signal CS2 (for example, a high voltage) is supplied from the mode controller 350 to electrically connect the driver 312 and the second mode driver 330.

The third switch SW3 may be connected between the driver 312 and the third mode driver 340. The third switch SW3 may be turned on when an enable third control signal CS3 (for example, a high voltage) is supplied from the mode controller 350 to electrically connect the driver 312 and the third mode driver 340.

Figure 4:
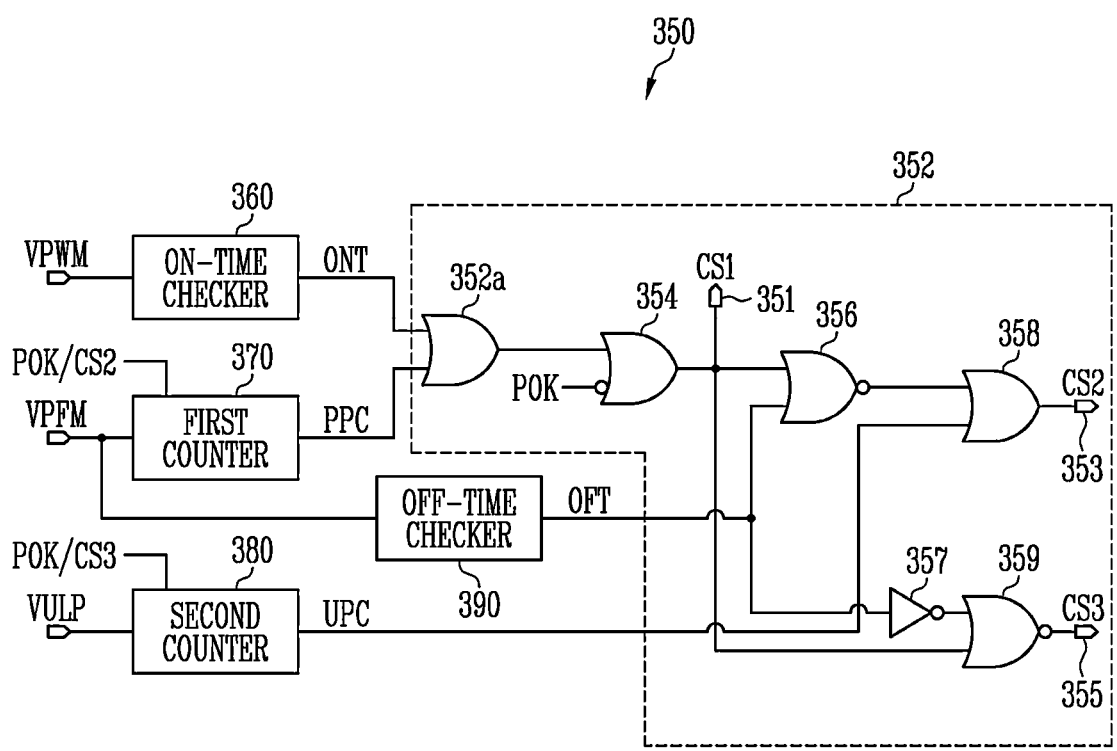
FIG. 4 is a diagram illustrating an embodiment of a mode controller shown in FIG. 3.

FIG. 4 is a diagram illustrating an embodiment of the mode controller shown in FIG. 3.

Referring to FIG. 4, the mode controller 350 according to an embodiment of the disclosure may include an on-time checker 360, an off-time checker 390, a first counter 370, a second counter 380, and a controller 352.

The controller 352 may generate a first control signal CS1, a second control signal CS2, and a third control signal CS3 using an on-time control signal ONT, an off-time control signal OFT, a first count signal PPC, and a second count signal UPC. To this end, the controller 352 may include logic gates 352a, 354, 356, 357, 358, and 359.

A first logic gate 352a may receive the on-time control signal ONT from the on-time checker 360 and receive the first count signal PPC from the first counter 370. The first logic gate 352a is an OR gate, and may output by performing an OR operation on the on-time control signal ONT and the first count signal PPC.

A second logic gate 354 may receive an output signal of the first logic gate 352a and an inverted power signal/POK. Here, the power signal POK may be a high voltage when an output voltage Vout of the DC-DC converter 300 is a certain target voltage or higher. That is, the power signal POK may be the high voltage when the DC-DC converter 300 is normally driven. The power signal POK may be inverted (that is, logic "0") and the inverted power signal/POK may be supplied to the second logic gate 354.

The second logic gate 354 may be an OR gate and may output by performing an OR operation on the output signal of the first logic gate 352a and the inverted power signal/POK. An output signal of the second logic gate 354 may be supplied to a first output terminal 351.

A third logic gate 356 may receive the off-time control signal OFT from the off-time checker 390 and receive the first control signal CS1 from the second logic gate 354. The third logic gate 356 may be a NOR gate and may output by performing a NOR operation on the off-time control signal OFT and the first control signal CS1.

A fourth logic gate 358 may receive the second count signal UPC from the second counter 380 and receive an output signal of the third logic gate 356. The fourth logic gate 358 may be an OR gate and may output by performing an OR operation on the second count signal UPC and the output signal of the third logic gate 356. An output signal of the fourth logic gate 358 may be supplied to a second output terminal 353 as the second control signal CS2.

A fifth logic gate 359 may receive an inverted off-time control signal/OFT and the first control signal CS1. The fifth logic gate 359 may be a NOR gate and may output by performing a NOR operation on the inverted off-time control signal/OFT and the first control signal CS1. An output signal of the fifth logic gate 359 may be supplied to a third output terminal 355 as the third control signal CS3.

A sixth logic gate 357 may invert the off-time control signal OFT and supplies the inverted off-time control signal/OFT to the fifth logic gate 359. The sixth logic gate 357 is a NOT gate.

The on-time checker 360 may be driven when the voltage generator 310 operates in a first mode (PWM mode). The on-time checker 360 may determine an enable period (or an on-time period) of the first switching signal VPWM. The on-time checker 360 may determine the output load using the on-time period. For example, the on-time checker 360 may determine whether the output load is lower than the first load using the on-time period.

When driven in the PWM method, the on-time period may be decreased when the output load is decreased. The on-time checker 360 may determine that the output load is less than a first load when the on-time period is decreased. For example, the on-time checker 360 may generate an enable on-time control signal ONT when the on-time period of the first switching signal VPWM is greater than or equal to a predetermined time and generate a disable on-time control signal ONT when the on-time period of the first switching signal VPWM is less than the predetermined time.

When it is determined that the output load is greater than or equal to the first load, the on-time checker 360 may output the enable on-time control signal ONT (for example, a high voltage) (or corresponding to logic "1"), and when it is determined that the output load is less than the first load, the on-time checker 360 may output the disable on-time control signal ONT (for example, a low voltage) (or corresponding to logic "0").

The off-time checker 390 may be driven when the voltage generator 310 operates in a second mode (PFM mode). The off-time checker 390 may determine a disable period (or an off-time period) of the second switching signal VPFM. The off-time checker 390 may determine the output load using the off-time period. For example, the off-time checker 390 may determine whether the output load is lower than a second load using the off-time period.

When the off-time period of the second switching signal VPFM is less than the predetermined time, the off-time checker 390 may generate an enable off-time control signal OFT, and when the off-time period of the second switching signal VPFM is greater than or equal to the predetermined time, the off-time checker 390 may generate a disable off-time control signal OFT.

When driven in the PFM method, the off-time period may be increased when the output load is decreased. The off-time checker 390 may determine that the output load is lower than the second load when the off-time period is increased.

When it is determined that the output load is greater than or equal to the second load, the off-time checker 390 may output the enable off-time control signal OFT (for example, a low voltage) (or corresponding to logic "0"), and when it is determined that the output load is less than the second load, the off-time checker 390 may output the disable off-time control signal OFT (for example, a high voltage) (or corresponding to logic "1").

The first counter 370 may be driven when the voltage generator 310 operates in the second mode (PFM mode). The first counter 370 may count the second switching signal VPFM when the feedback voltage VFB is lower than the reference voltage Vref in the second mode driver 330. Here, a case where the feedback voltage VFB is lower than the reference voltage Vref may mean a case where an output voltage Vout is required to be increased. The first counter 370 may include a k (k is a natural number) bit counter, and when the second switching signal VPFM is repeated k times or more (for example, k+1 times), an enable first count signal PPC (or a high voltage) may be output. Here, the enable first count signal PPC may correspond to logic "1". The first counter 370 may output a disable first count signal PPC (or a low voltage) (for example, corresponding to logic "0") during a period in which the enable first count signal PPC is not output.

The second counter 380 may be driven when the voltage generator 310 operates in a third mode (ULP mode). The second counter 380 may count the third switching signal VULP when the feedback voltage VFB is lower than the reference voltage Vref in the third mode driver 330. Here, a case where the feedback voltage VFB is lower than the reference voltage Vref may mean a case where the output voltage Vout is required to be increased. The second counter 380 may include a p (p is a natural number less than k) bit counter and output an enable second count signal UPC (or a high voltage) when the third switching signal VULP is repeated p or more times (for example, p+1 times). Here, the enable second count signal UPC may correspond to logic "1". The second counter 380 may output a disable second count signal UPC or (a low voltage) (for example, corresponding to logic "0") during a period in which the enable second count signal UPC is not output.

Figure 5:
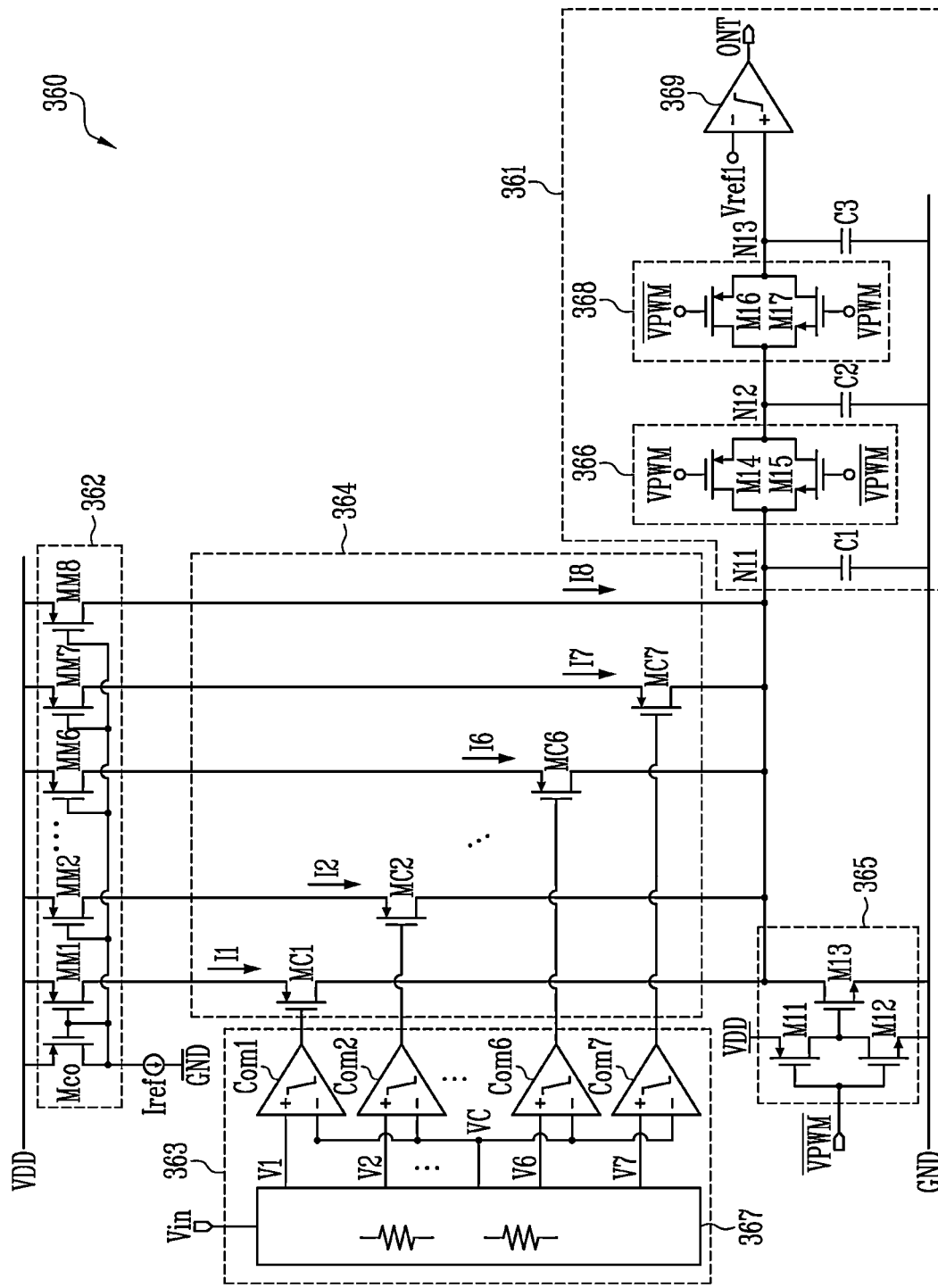
FIG. 5 is a diagram illustrating an embodiment of an on-time checker shown in FIG. 4.

FIG. 5 is a diagram illustrating an embodiment of the on-time checker shown in FIG. 4.

Referring to FIG. 5, the on-time checker 360 may determine the output load using the on-time period of the first switching signal VPWM. When the on-time period of the first switching signal VPWM is shortened, the on-time checker 360 may determine that the output load decreases and output the disable on-time control signal ONT for a driving method change. When the disable on-time control signal ONT is output, a driving method of the DC-DC converter 300 may be changed from a PWM to a PFM.

The on-time checker 360 may include a current supply 362, a current controller 363, a current selector 364, a reset unit 365, and an on-time control signal generator 361.

The current supply 362 may supply a plurality of currents I1, I2, . . . , I6, I7, and I8 to the current selector 364. To this end, the current supply 362 may include a control transistor Mco connected between a first power source VDD and a current source Iref, and mirror transistors MM1, MM2, . . . , MM6, MM7, and MM8. A gate electrode of each of the mirror transistors MM1, MM2, . . . , MM6, MM7, and MM8 which is connected to the gate of the control transistor Mco and a drain of each of the mirror transistors MM1, MM2, . . . , MM6, MM7, and MM8 is connected to the first power source VDD.

The control transistor Mco may be diode connected and may supply a current corresponding to the current source Iref. Each of the mirror transistors MM1 to MM8 may supply the currents I1 to I8 corresponding to a current amount flowing in the control transistor Mco to the current selector 364.

The current controller 363 may include a voltage distributer 367 for distributing the input voltage Vin, and comparators Com1, Com2, . . . , Com6, and Com7 for controlling the current selector 364 in response to a comparison result of output voltages V1, V2, . . . , V6, and V7 of the voltage distributer 367 and a comparison voltage Vc.

The voltage distributer 367 may include a plurality of resistors and may generate the output voltages V1 to V7 by distributing the input voltage Vin. Each of the comparators Com1 to Com7 compares the output voltage (any one of V1 to V7) supplied thereto with the comparison voltage Vc, and controls turn-on or turn-off of current transistors Mc1, Mc2, . . . , Mc6, and Mc7 included in the current selector 364 by outputting a control voltage corresponding to the comparison result. The current controller 363 may control a current amount supplied to the first node N11 in response to a magnitude of the input voltage Vin.

The current selector 364 may include the current transistors Mc1 to Mc7 connected between each of the mirror transistors MM1 to MM7 and a first node N11. A gate electrode of each of the current transistors Mc1 to Mc7 may be connected to any one output node of the comparators Com1 to Com7. Each of the current transistors Mc1 to Mc7 may be turned on or turned off in response to a voltage supplied from the comparators Com1 to Com7. In addition, the current I8 supplied from an eighth mirror transistor MM8 may be supplied directly to the first node N11 without passing through a current transistor.

The reset unit 365 may initialize the first node N11 in response to an inverted first switching signal /VPWM. To this end, the reset unit 365 may include a first transistor M11, a second transistor M12, and a third transistor M13.

The first transistor M11 and the second transistor M12 are connected in series between the first power source VDD and the ground potential GND. The inverted first switching signal /VPWM may be supplied to a gate electrode of the first transistor M11 and the second transistor M12. The first transistor M11 and the second transistor M12 may be alternately turned on in response to the inverted first switching signal /VPWM. To this end, the first transistor M11 may be a P type, and the second transistor M12 may be an N type.

The third transistor M13 may be connected between the first node N11 and the ground potential GND. In addition, a gate electrode of the third transistor M13 may be connected to a common node of the first transistor M11 and the second transistor M12. The third transistor M13 may be an N type, may be turned on when the first transistor M11 is turned on, and may be turned off when the second transistor M12 is turned on.

The on-time control signal generator 361 may include transmission gates 366 and 368, an output unit 369, a first capacitor C1, a second capacitor C2, and a third capacitor C3.

The first capacitor C1 may be connected between the first node N11 and the ground potential GND. The first capacitor C1 may store a voltage of the first node N11.

The second capacitor C2 may be connected between a second node N12 and the ground potential GND. The second capacitor C2 may store a voltage of the second node N12.

The third capacitor C3 may be connected between a third node N13 and the ground potential GND. The third capacitor C3 may store a voltage of the third node N3.

A transmission gate 366 may be connected between the first node N11 and the second node N12. The first transmission gate 366 controls an electrical connection of the first node N11 and the second node N12 in response to the first switching signal VPWM and the inverted first switching signal /VPWM. To this end, the first transmission gate 366 may include a fourth transistor M14 and a fifth transistor M15.

The fourth transistor M14 may be connected between the first node N11 and the second node N12, and may be turned on and turned off in response to the first switching signal VPWM. The fifth transistor M15 may be connected between the first node N11 and the second node N12, and may be turned on and turned off in response to the inverted first switching signal /VPWM.

A second transmission gate 368 may be connected between the second node N12 and the third node N13. The second transmission gate 368 controls an electrical connection of the second node N12 and the third node N13 in response to the inverted first switching signal /VPWM and the first switching signal VPWM. To this end, the second transmission gate 368 may include a sixth transistor M16 and a seventh transistor M17.

The sixth transistor M16 may be connected between the second node N12 and the third node N13, and may be turned on and turned off in response to the inverted first switching signal /VPWM. The seventh transistor M17 may be connected between the second node N12 and the third node N13, and may be turned on and turned off in response to the first switching signal VPWM. The second transmission gate 368 may be turned on and turned off alternately with the first transmission gate 368.

The output unit 369 may compare a voltage of the third node N13 with a first reference voltage Vref1 and generate an on-time control signal ONT in response to a comparison result. The output unit 369 may be a comparator.

Figure 6:
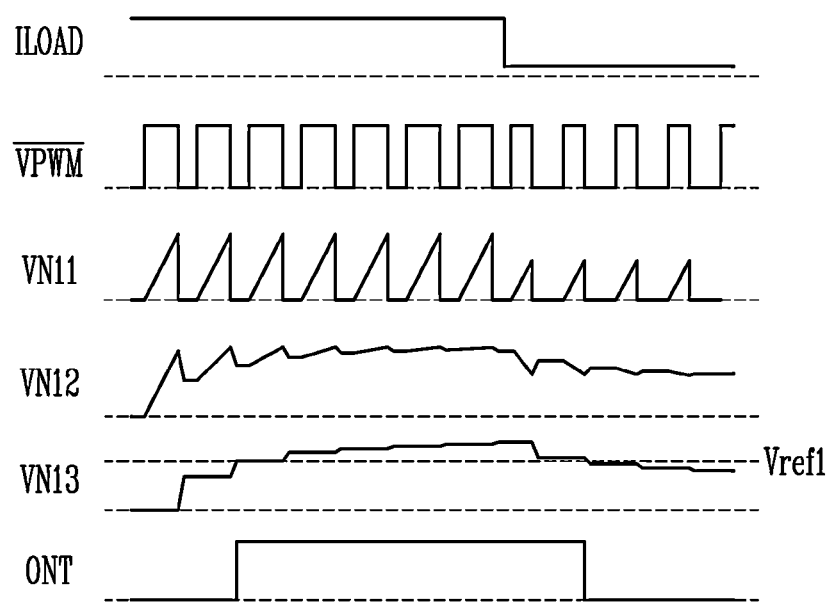
FIG. 6 is a waveform diagram illustrating an embodiment of a method of driving the on-time checker shown in FIG. 5.

FIG. 6 is a waveform diagram illustrating an embodiment of a method of driving the on-time checker shown in FIG. 5.

Referring to FIG. 6, during a high period of the inverted first switching signal /VPWM, the first transistor M11 is turned off and the second transistor M12 is turned on. When the second transistor M12 is turned on, the third transistor M13 is turned off.

Therefore, during the high period of the inverted first switching signal /VPWM, the voltage of the first node N11 increases in response to a current supplied from the current supply 362 via the current selector 364. In addition, during the high period of the inverted first switching signal /VPWM, the first transmission gate 366 may be turned on (M14 and M15 are turned on), and thus the voltage of the first node N11 may be supplied to the second node N12.

During a low period of the inverted first switching signal /VPWM, the first transistor M11 is turned on and the second transistor M12 is turned off. When the first transistor M11 is turned on, the third transistor M13 is turned on. When the third transistor M13 is turned on, the voltage VN11 of the first node N11 may be initialized to the ground potential GND.

During the low period of the inverted first switching signal /VPWM, the second transmission gate 368 may be turned on (M16 and M17 are turned on), and thus the voltage VN12 of the second node N12 may be supplied to the third node N13.

The inverted first switching signal /VPWM may be supplied in a pulse form, and thus the voltage VN13 of the third node N13 may be increased to a peak voltage equal to higher than the first reference voltage Vref1. Here, when the voltage VN13 of the third node N13 is the first reference voltage Vref1 or higher, it may be determined that a high output load ILOAD is applied, and thus the output unit 369 may output the enable on-time control signal ONT (that is, a high voltage, or logic "1").

When the enable on-time control signal ONT is output from the on-time checker 360, a signal of "1" is output from the first logic gate 352a and the second logic gate 354. At this time, the enable first control signal CS1 (or a high voltage) may be output from the first output terminal 351. In addition, a disable second control signal CS2 (or a low voltage) may be output at the second output terminal 353, and a disable third control signal CS3 (or a low voltage) may be output at the third output terminal 355.

Therefore, when the enable on-time control signal ONT is output from the on-time checker 360, the first switch SW1 may be turned on, and the driver 312 may be driven in the first mode (that is, PWM mode).

Meanwhile, when the output load ILOAD is decreased, the on-time period of the first switching signal VPWM (that is, a high voltage period of the inverted switching signal /VPWM) may be shortened. When the on-time period of the first switching signal VPWM is shortened, the voltage VN12 of the second node N12 may be discharged to the first node N11, and the voltage VN13 of the third node N13 may be discharged to the second node N12.

Then, the voltage VN13 of the third node N13 may be less than or equal to the first reference voltage Vref1. When the voltage VN13 of the third node N13 is less than or equal to the first reference voltage Vref, the output unit 369 may output the disable on-time control signal ONT (that is, a low voltage or logic "0").

When the disable on-time control signal ONT is output from the on-time checker 360, a signal of "0" is output from the first logic gate 352a and the second logic gate 354. At this time, a disable first control signal CS1 may be output from the first output terminal 351.

Meanwhile, while the on-time checker 360 is driven, the off-time checker 390 may not be driven, and thus may output logic "0". Therefore, when the disable first control signal CS1 is output from the first output terminal 351, a signal of "1" is output from the third logic gate 356, and a signal of "1" is output from the fourth logic gate 358 in response thereto. At this time, the enable second control signal CS2 may be output from the second output terminal 353. The disable third control signal CS3 (or a low voltage) may be output from the third output terminal 355.

When the enable second control signal CS2 is output, the second switch SW2 may be turned on, and the driver 312 may be driven in the second mode (that is, the PFM mode). That is, in an embodiment of the disclosure, when the output load ILOAD is decreased when driving in the PWM mode, a driving mode may be changed from the PWM to the PFM.

Figure 7:
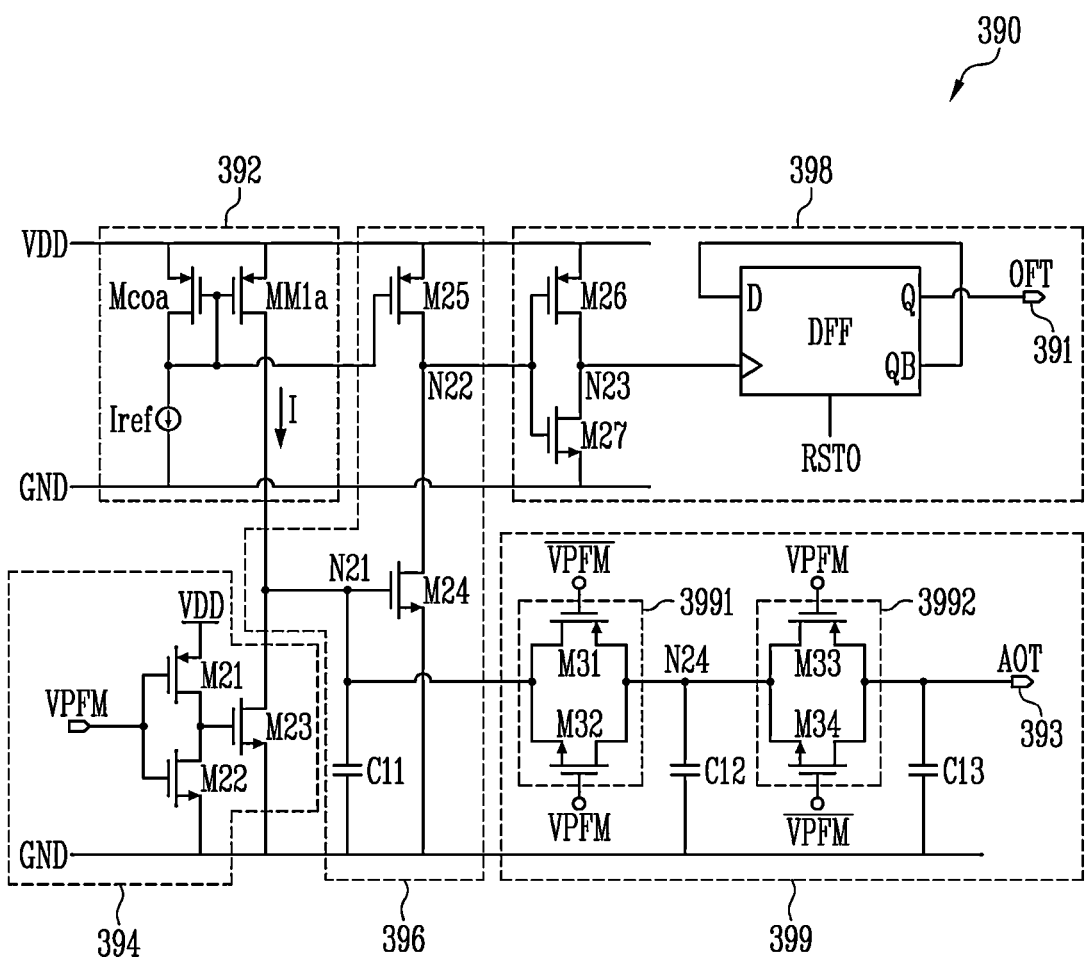
FIG. 7 is a diagram illustrating an embodiment of an off-time checker shown in FIG. 4.

FIG. 7 is a diagram illustrating an embodiment of the off-time checker shown in FIG. 4.

Referring to FIG. 7, the off-time checker 390 may determine the output load ILOAD using an off-time period of the second switching signal VPFM. When the off-time period of the second switching signal VPFM becomes longer, the off-time checker 390 may determine that the output load ILOAD is decreased, and generate a disable off-time control signal OFT for the driving method change. When the disable off-time control signal OFT is output, the driving method of the DC-DC converter 300 may be changed from the PFM to a ULP.

The off-time checker 390 may include a current supply 392, a reset unit 394, a controller 396, a first output unit 398, and a second output unit 399.

The current supply 392 may supply a current I to the controller 396. To this end, the current supply 392 may include a control transistor Mcoa connected between the first power source VDD and the current source Iref, and a mirror transistor MM1a connected to the control transistor Mcoa in a current mirror.

The control transistor Mcoa may be diode connected and may supply a current corresponding to the current source Iref. A gate electrode of the mirror transistor MM1a may be electrically connected to a gate electrode of the control transistor Mcoa. The mirror transistor MM1a may supply a current I corresponding to a current amount flowing in the control transistor Mcoa to the controller 396.

The controller 396 controls a voltage of a second node N22 in response to a current amount supplied from the current supply 392, that is, in response to a voltage of a first node N21. To this end, the controller 396 may include a fourth transistor M24, a fifth transistor M25, and a first capacitor C11.

The fourth transistor M24 is connected between the second node N22 and the ground potential GND. In addition, a gate electrode of the fourth transistor M24 is connected to the first node N21. The fourth transistor M24 may control the voltage of the second node N22 by turning on or turning off in response to a voltage of the first node N21.

The fifth transistor M25 is connected between the first power source VDD and the second node N22. In addition, a gate electrode of the fifth transistor M25 is connected to the gate electrode of the control transistor Mcoa. That is, the fifth transistor M25 is connected to the control transistor Mcoa in a current mirror and may supply a predetermined current to the second node N22. Therefore, when the fourth transistor M24 is a turn-off state, the second node N22 may be a voltage of the first power source VDD.

The first capacitor C11 may store the voltage of the first node N21.

The reset unit 394 may initialize the first node N21 in response to the second switching signal VPFM. To this end, the reset unit 394 may include a first transistor M21, a second transistor M22, and a third transistor M23.

The first transistor M21 and the second transistor M22 are connected in series between the first power source VDD and the ground potential GND. The second switching signal VPFM may be supplied to a gate electrode of the first transistor M21 and the second transistor M22. The first transistor M21 and the second transistor M22 may be alternately turned on in response to the second switching signal VPFM. To this end, the first transistor M21 may be a P type, and the second transistor M22 may be an N type.

The third transistor M23 may be connected between the first node N21 and the ground potential GND. In addition, a gate electrode of the third transistor M23 may be connected to a common node of the first transistor M21 and the second transistor M22. The third transistor M23 may be an N type, may be turned on when the first transistor M21 is turned on, and may be turned off when the second transistor M22 is turned on.

The first output unit 398 may generate the off-time control signal OFT in response to the voltage of the second node N22. To this end, the first output unit 398 may include a sixth transistor M26, a seventh transistor M27, and a flip-flop DFF.

The sixth transistor M26 and the seventh transistor M27 may be connected in series between the first power source VDD and the ground potential GND. In addition, a gate electrode of the sixth transistor M26 and the seventh transistor M27 may be connected to the second node N22. The sixth transistor M26 and the seventh transistor M27 may invert the voltage of the second node N22 and transfer the inverted voltage to the third node N23. That is, the sixth transistor M26 and the seventh transistor M27 may configure an inverter. To this end, the sixth transistor M26 may be formed as a P type, and the seventh transistor M27 may be formed as an N type.

The flip-flop DFF may output the off-time control signal OFT to the first output terminal 391 in response to a voltage of the third node N23, which is a common node of the sixth transistor M26 and the seventh transistor M27. For example, when the voltage of the third node N23 is a high voltage (that is, logic "1"), the flip-flop DFF may output a disable off-time control signal OFT, and when the voltage of the third node N23 is a low voltage (that is, logic "0"), the flip-flop DFF may output the enable off-time control signal OFT.

The flip-flop DFF may be a D flip-flop. A clock input unit of the flip-flop DFF may be connected to the third node N23, and a Q terminal may be connected to the first output terminal 391. In addition, a QB terminal of the flip-flop DFF may be connected to a D terminal.

The second output unit 399 may generate an on-time change signal AOT in response to the voltage of the first node N21. The on-time change signal AOT may be used to change an on-time of the second switching signal VPFM when driven in the PFM method. In an embodiment of the disclosure, the second output unit 399 may be eliminated.

The second output unit 399 may include transmission gates 3991 and 3992, a second capacitor C12, and a third capacitor C13.

The second capacitor C12 may be connected between a fourth node N24 and the ground potential GND. The second capacitor C12 may store a voltage of the fourth node N24.

The third capacitor C13 may be connected between the second output terminal 393 and the ground potential GND. The third capacitor C13 may store a voltage of the second output terminal 393.

A first transmission gate 3991 may be connected between the first node N21 and the fourth node N24. The first transmission gate 3991 controls an electrical connection of the first node N21 and the fourth node N24 in response to the second switching signal VPFM and an inverted second switching signal /VPFM. To this end, the first transmission gate 3991 may include a first transistor M31 and a second transistor M32.

The first transistor M31 may be connected between the first node N21 and the fourth node N24, and may be turned on and turned off in response to the inverted second switching signal /VPFM. The second transistor M32 is connected between the first node N21 and the fourth node N24, and may be turned on and turned off in response to the second switching signal VPFM.

A second transmission gate 3992 may be connected between the fourth node N24 and the second output terminal 393. The second transmission gate 3992 controls an electrical connection between the fourth node N24 and the second output terminal 393 in response to the inverted second switching signal /VPFM and the second switching signal VPFM. To this end, the second transmission gate 3992 may include a third transistor M33 and a fourth transistor M34.

The third transistor M33 may be connected between the fourth node N24 and the second output terminal 393, and may be turned on and turned off in response to the second switching signal VPFM. The fourth transistor M34 may be connected between the fourth node N24 and the second output terminal 393, and may be turned on and turned off in response to the inverted second switching signal /VPFM.

Figure 8:
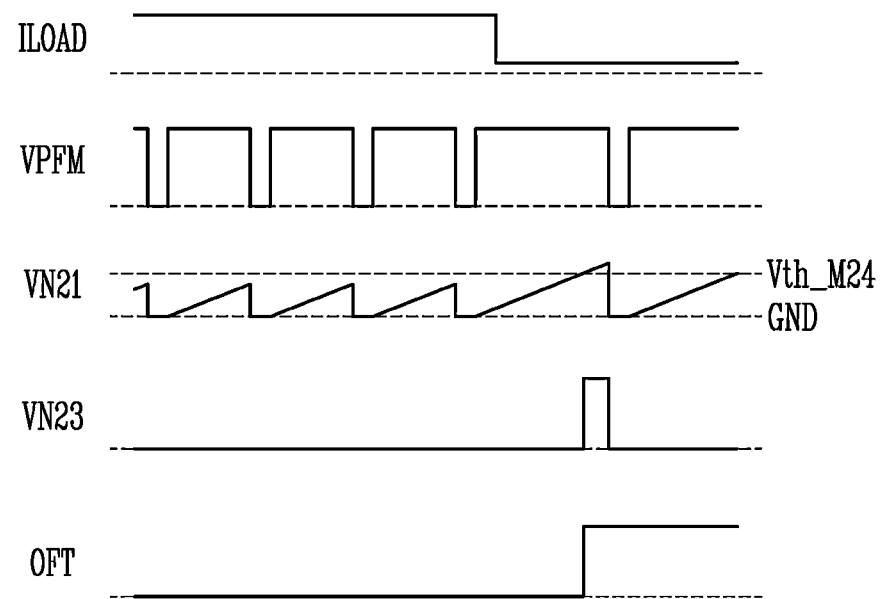
FIG. 8 is a waveform diagram illustrating an embodiment of a method of driving the off-time checker shown in FIG. 7.

FIG. 8 is a waveform diagram illustrating an embodiment of a method of driving the off-time checker shown in FIG. 7.

Referring to FIG. 8, during a low period of the second switching signal VPFM, the first transistor M21 is turned on and the second transistor M22 is turned off. When the first transistor M21 is turned on, the voltage of the first power source VDD is supplied to the gate electrode of the third transistor M23, and thus the third transistor M23 is turned on. When the third transistor M23 is turned on, the voltage VN21 of the first node N21 is initialized to the ground potential GND.

During a high period of the second switching signal VPFM, the first transistor M21 is turned off and the second transistor M22 is turned on. When the second transistor M22 is turned on, a voltage of the ground potential GND may be supplied to the gate electrode of the third transistor M23, and thus the third transistor M23 is turned off.

At this time, the voltage VN21 of the first node N21 may be gradually increased by the current I supplied from the current supply 392. Here, when the off-time period (that is, a high period) of the second switching signal VPFM is set short (that is, when the output load ILOAD is high), the voltage VN21 of the first node N21 may be lower than a threshold voltage Vth_M24 of the transistor M24, and thus the fourth transistor M24 maintains a turn-off state.

When the fourth transistor M24 is turned off, the second node N22 may be the voltage of the first power source VDD, and thus the seventh transistor M27 is a turn-on state. When the seventh transistor M27 is the turn-on state, a clock signal may not be supplied to the flip-flop DFF or (the voltage VN23 of the third node N23 maintains a low voltage), and thus the flip-flop DFF may output the enable off-time control signal OFT (that is, a low voltage).

When the enable off-time control signal OFT is output from the off-time checker 390, logic "1" is output from the third logic gate 356. When logic "1" is output from the third logic gate 356, logic "1" is also output from the fourth logic gate 358. At this time, the enable second control signal CS2 may be output from the second output terminal 353. At this time, the disable first control signal CS1 may be output from the first output terminal 351 and the disable third control signal CS3 may be output from the third output terminal 355.

Therefore, when the enable off-time control signal OFT is output from the off-time checker 390, the second switch SW2 may be turned on, and the driver 312 may be driven in the second mode 312 (that is, the PFM mode).

Meanwhile, when the output load ILOAD is decreased, the off-time period of the second switching signal VPFM may become longer. When the off-time period of the second switching signal VPFM becomes longer, the voltage VN21 of the first node N21 may be higher than the threshold voltage Vth_M24 of the fourth transistor M24, and thus the fourth transistor M24 may be turned on.

When the fourth transistor M24 is turned on, the second node N22 is set to the voltage of the ground potential GND, and thus the sixth transistor M26 is set to a turn-on state. When the sixth transistor M26 is the turn-on state, a clock signal (that is, a high voltage of the third node N23) may be supplied to the flip-flop DFF, and thus the flip-flop DFF may output the disable off-time control signal OFT (that is, a high voltage).

When the disable off-time control signal OFT is output from the off-time checker 390, logic "0" is output from the third logic gate 356. When logic "0" is output from the third logic gate 356, logic "0" is also output from the fourth logic gate 358. At this time, the disable second control signal CS2 may be output from the second output terminal 353.

In addition, when the disable off-time control signal OFT is output from the off-time checker 390, logic "1" is output from the fifth logic gate 359. At this time, the enable third control signal CS3 may be output from the third output terminal 355. When the enable third control signal CS3 is output, the third switch SW3 may be turned on, and the driver 312 may be driven in the third mode (that is, the ULP mode). That is, in an embodiment of the disclosure, when the output load ILOAD is decreased during the PFM mode, the driving mode may be changed from the PFM to the ULP.

Meanwhile, a reset signal RSTO may be supplied after a predetermined time after the disable off-time control signal OFT is supplied from the flip-flop DFF. When the reset signal RSTO is supplied, the flip-flop DFF may output a low voltage.

Figure 9:
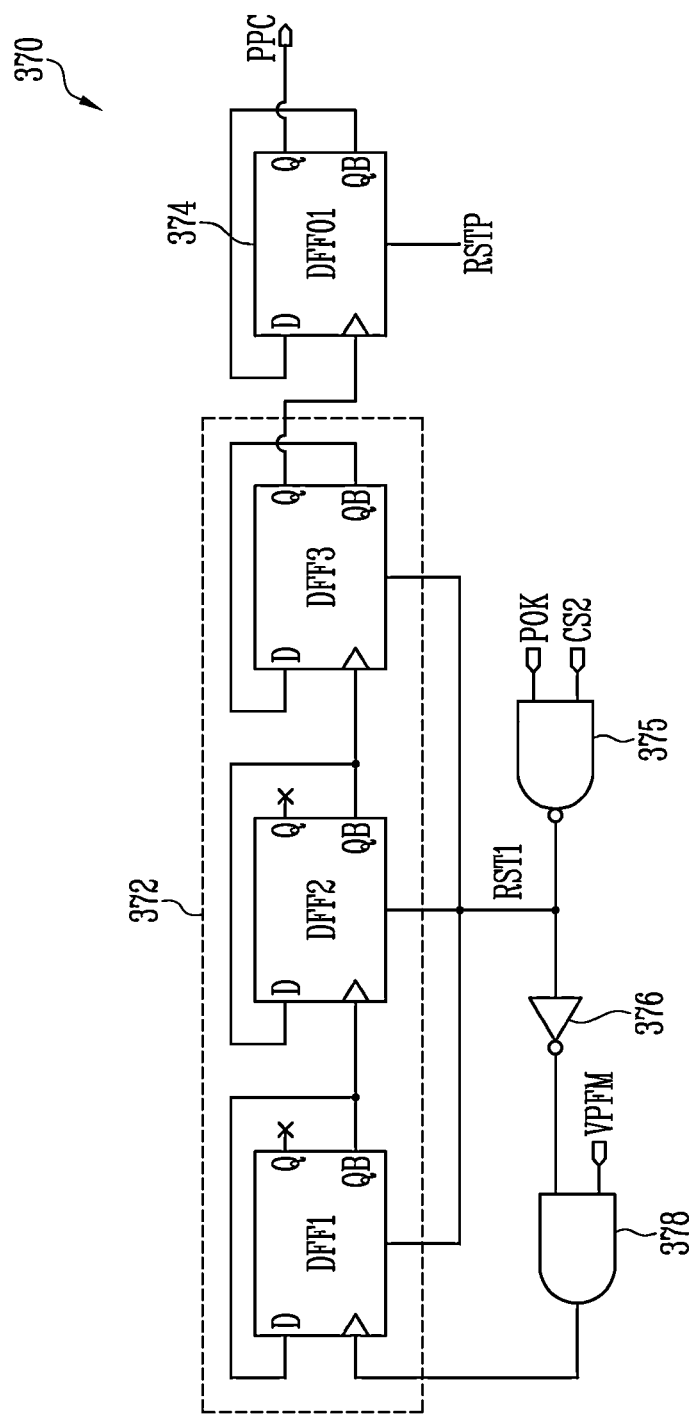
FIG. 9 is a diagram illustrating an embodiment of a first counter shown in FIG. 4.

FIG. 9 is a diagram illustrating an embodiment of the first counter shown in FIG. 4.

Referring to FIG. 9, the first counter 370 may be driven only in a period when the mode controller 350 is driven in the second mode (that is, the PFM mode). The first counter 370 may count the second switching signal VPFM when the feedback voltage VFB is lower than the reference voltage Vref in the second mode driver 330.

A case where the feedback voltage VFB is equal to higher than the reference voltage Vref may mean that the output voltage Vout is stably generated in the second mode. Therefore, when the feedback voltage VFB is higher than or equal to the reference voltage Vref, the first count 370 is not driven. For example, when the feedback voltage VFB is higher than or equal to the reference voltage Vref, the mode controller 350 may supply a reset signal RST1.

The first counter 370 may include a k bit counter 372, an output unit 374, a first logic gate 375, a second logic gate 376, and a third logic gate 378.

The first logic gate 375 receives the power signal POK and the second control signal CS2. Here, the power signal POK maintains a high voltage (that is, logic "1") during normal driving. Therefore, an output of the first logic gate 375 may be determined by the second control signal CS2. The first logic gate 375 may be a NAND gate, and may output logic "0" when the second control signal CS2 is logic "1". In addition, the first logic gate 375 may output logic "1" when the second control signal CS2 is logic "0".

The output of logic "1" from the first logic gate 375 means that the reset signal RST1 is supplied to the bit counter 372, and thus the counter 372 is not driven. That is, when the disable second control signal CS2 is supplied (that is, when the DC-DC converter 300 is not driven in the PFM mode), the first counter 370 is not driven.

The second logic gate 376 may invert a signal of the first logic gate 375 and supply the inverted signal to the third logic gate 378. The second logic gate 376 may output a signal of logic "1" when the feedback voltage VFB is lower than the reference voltage Vref and the DC-DC converter 300 is driven in the second mode. The second logic gate 376 may be a NOT gate.

The third logic gate 378 receives an output of the second logic gate 376 and the second switching signal VPFM. The third logic gate 378 may transfer the second switching signal VPFM to the counter 372 when the output of the second logic gate 376 is logic "1". The third logic gate 378 may be an AND gate.

The counter 372 may be a k bit counter. In FIG. 9, it is assumed that k is 3 for convenience of description. The counter 372 may include D flip-flops DFF1, DFF2, and DFF3 and may count the second switching signal VPFM.

The counter 372 may be reset when the feedback voltage VFB is higher than or equal to the reference voltage Vref while counting the second switching signal VPFM or when the DC-DC converter 300 is driven in a mode other than the second mode.

The counter 372 may count the second switching signal VPFM and supply a count signal to the output unit 374. When the count signal is input from the counter 372, the output unit 374 may output an enable first count signal PPC (a high voltage, or logic "1"). The output unit 374 (or DFFO1) may be reset by the reset signal RSTP after a predetermined time after the enable first count signal PPC is output. The output unit 374 may be a D flip-flop.

When the enable first count signal PPC is output from the first counter 370, logic "1" is output from the first logic gate 352a and the second logic gate 354. In this case, the enable first control signal CS1 (or a high voltage) may be output from the first output terminal 351. In addition, the disable second control signal CS2 (or a low voltage) may be output from the second output terminal 353, and the disable third control signal CS3 (or a low voltage) may be output from the third output terminal 355.

That is, when the enable first count signal PPC is output from the first counter 370, the first switch SW1 may be turned on, and the driver 312 may be driven in the first mode (that is, the PWM mode).

In more detail, when the output load ILOAD increases when driving in the PFM mode, the off-time of the second switching signal VPFM may be shortened. Here, generation of the enable first count signal PPC in the first counter 370 means that the output voltage Vout is set to a voltage lower than a desired voltage even though the second switching signal VPFM is supplied a plurality of times. In this case, it may be determined that the output load ILOAD is in a high state, and the DC-DC converter 300 may be driven in the first mode.

Figure 10:
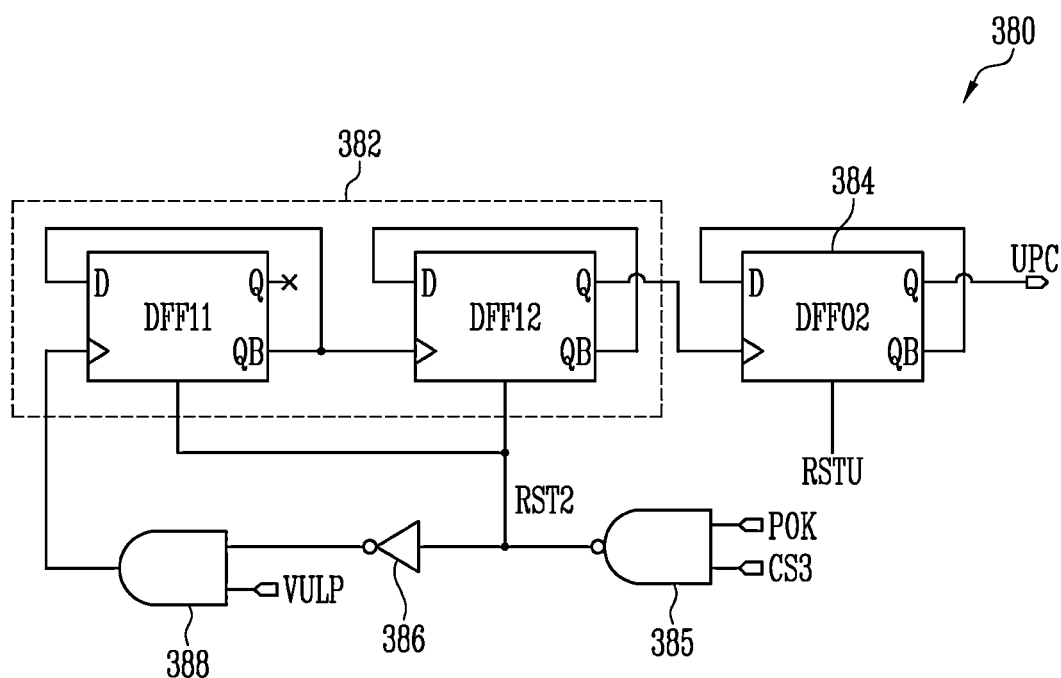
FIG. 10 is a diagram illustrating an embodiment of a second counter shown in FIG. 4.

FIG. 10 is a diagram illustrating an embodiment of the second counter shown in FIG. 4.

Referring to FIG. 10, the second counter 380 may be driven only during a period when the second counter 380 is driven in the third mode (that is, the ULP mode). The second counter 380 may count the third switching signal VULP when the feedback voltage VFB is lower than the reference voltage Vref in the third mode driver 340.

A case where the feedback voltage VFB is higher than or equal to the reference voltage Vref may mean that the output voltage Vout is stably generated in the third mode. Therefore, when the feedback voltage VFB is higher than or equal to the reference voltage Vref, the second counter 380 is not driven. For example, when the feedback voltage VFB is higher than or equal to the reference voltage Vref, the mode controller 350 may supply a reset signal RST2 to the bit counter 382.

The second counter 380 may include a p bit counter 382, an output unit 384, a first logic gate 385, a second logic gate 386, and a third logic gate 388.

The first logic gate 385 receives the power signal POK and the third control signal CS3. Here, the power signal POK maintains a high voltage (that is, logic "1") during normal driving. Therefore, an output of the first logic gate 385 may be determined by the third control signal CS3. The first logic gate 385 may be a NAND gate, and may output logic "0" when the third control signal CS3 is logic "1". In addition, the first logic gate 385 may output logic "1" when the third control signal CS3 is logic "0".

The output of logic "1" from the first logic gate 385 means that the reset signal RST2 is supplied to the bit counter 382, and thus the bit counter 382 is not driven. That is, when the disable third control signal CS3 is supplied (that is, when the DC-DC converter 300 is not driven in the ULP mode), the second counter 380 is not driven.

The second logic gate 386 may invert the signal of the first logic gate 385 and supply the inverted signal to the third logic gate 388. The second logic gate 386 may supply a signal of logic "1" when the feedback voltage VFB is lower than the reference voltage Vref and the DC-DC converter 300 is driven in the third mode. The second logic gate 386 may be a NOT gate.

The third logic gate 388 receives an output of the second logic gate 386 and the third switching signal VULP. The third logic gate 388 may transfer the third switching signal VULP to the bit counter 382 when the output of the second logic gate 386 is logic "1". The third logic gate 388 may be an AND gate.

The counter 382 may be a p bit counter. The counter 382 included in the second counter 380 may be a counter of a bit lower than the counter 372 included in the first counter 370. Since a frequency of the third switching signal VULP is set lower than a frequency of the second switching signal VPFM, the second counter 380 may include the counter 382 of a bit lower than that of the first counter 370.

In FIG. 10, it is assumed that p is 2 for convenience of description. The counter 382 may include D flip-flops DFF11 and DFF12 and may count the third switching signal VULP.

The counter 382 may be reset when the feedback voltage VFB is higher than or equal to the reference voltage Vref while counting the third switching signal VULP or when the DC-DC converter 300 is driven in a mode other than the third mode.

The counter 382 may count the third switching signal VULP and supply a count signal to the output unit 384. When the count signal is input from the counter 382, the output unit 384 may output the enable second count signal UPC (a high voltage, or logic "1"). The output unit 374 (or DFFO2) may be reset by the reset signal RSTU after a predetermined time after the enable second count signal UPC is output. The output unit 384 may be a D flip-flop.

When the enable second count signal UPC is output from the second counter 380, logic "1" is output from the fourth logic gate 358. In this case, the enable second control signal CS2 may be output from the second output terminal 353.

In addition, when the enable second count signal UPC is output from the second counter 380, a reset signal RSTO may be supplied to the output unit 398 and the enable off-time control signal OFT (or a low voltage) may be generated from the off-time checker 390.

When the enable second count signal UPC is output from the second counter 380, the second switch SW2 may be turned on, and the driver 312 may be driven in the second mode (that is, the PFM mode).

In more detail, when the output load ILOAD is increased when driving in the ULP mode, the output voltage Vout may be a voltage lower than a desired voltage even though the third switching signal VULP is supplied a plurality of times. In this case, it is determined that the output load ILOAD is in a high state, and the DC-DC converter 300 may be driven in the second mode.

Figure 11:
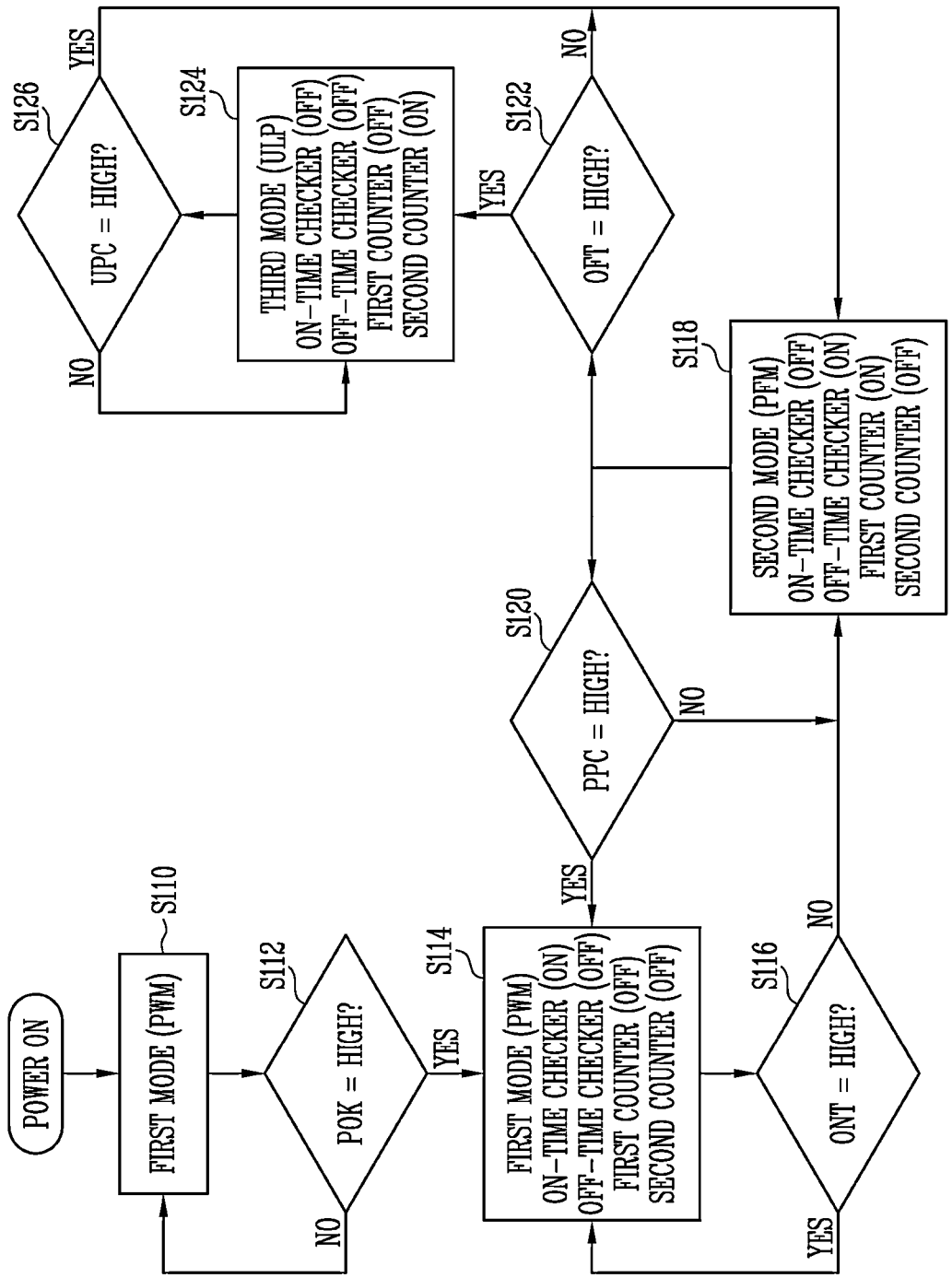
FIG. 11 is a flowchart illustrating an operation process of a DC-DC converter according to an embodiment of the disclosure.

FIG. 11 is a flowchart illustrating an operation process of a DC-DC converter according to an embodiment of the disclosure.

Referring to FIG. 11, first power is input to the DC-DC converter 300 (S110). After power is input to the DC-DC converter 300, the DC-DC converter 300 may determine whether the power signal POK is a high voltage while being driven in the first mode PWM (S112).

When the power signal POK is not the high voltage in step S112, steps S110 and S112 may be repeated. When the power signal POK is the high voltage in step S112, the DC-DC converter 300 may be driven in the first mode PWM (S114).

In step S114, the on-time checker 360 may be driven, and the off-time checker 390, the first counter 370, and the second counter 380 may not be driven. Thereafter, the mode controller 350 may determine whether the disable on-time control signal ONT (that is, a high voltage) is generated in the on-time checker 360 (S116). When the disable on-time control signal ONT is not generated in step S116, the DC-DC converter 300 is driven in the first mode PWM (S114 and S116).

When the disable on-time control signal ONT is generated in step S116, the DC-DC converter 300 may be driven in the second mode PFM (S116 and S118).

In step S118, the off-time checker 390 and the first counter 370 may be driven, and the on-time checker 360 and the second counter 380 may not be driven. Thereafter, the mode controller 350 may determine whether the disable off-time control signal OFT (that is, a high voltage) or the enable first count signal PPC is generated (S120 and S122).

When the enable first count signal PPC is generated in step S120, the DC-DC converter 300 may be driven in the first mode PWM (S120 and S114). When the enable first count signal PPC is not generated in step S120, the DC-DC converter 300 may maintain driving of the second mode PFM (S120 and S118).

When the disable off-time control signal OFT is not generated in step S122, the DC-DC converter 300 may maintain driving of the second mode PFM (S122 and S118). When the disable off-time control signal OFT is generated in step S122, the DC-DC converter 300 may be driven in the third mode ULP (S122 and S124).

In step S124, the second counter 380 may be driven, and the on-time checker 360, the off-time checker 390, and the first counter 370 may not be driven. Thereafter, the mode controller 350 may determine whether the enable second count signal UPC is generated in the second counter 389 (S126).

When the enable second count signal UPC is not generated in step S126, steps S124 and S126 may be repeated. When the enable second count signal UPC is generated in step S126, the DC-DC converter 300 may be driven in the second mode PFM (S126 and S118).

That is, in an embodiment of the disclosure, the mode controller 350 may determine the output load ILOAD using the switching signals VPWM, VPFM, VULP, and drive the DC-DC converter 300 in the first mode, the second mode, and the third mode in response to the output load ILOAD.

Figure 12:
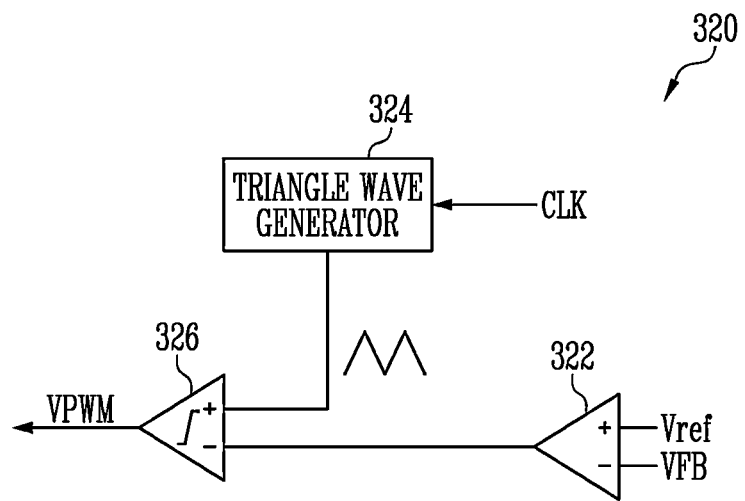
FIG. 12 is a diagram illustrating an embodiment of a first mode driver shown in FIG. 3.

FIG. 12 is a diagram illustrating an embodiment of the first mode driver shown in FIG. 3.

Referring to FIG. 12, the first mode driver 320 according to an embodiment of the disclosure may include an error amplifier 322, a triangle wave generator 324, and a comparator 326.

The error amplifier 322 may compare the feedback voltage VFB and the reference voltage Vref, and amplify and output a voltage corresponding to a difference between the feedback voltage VFB and the reference voltage Vref.

The triangle wave generator 324 may generate a triangle wave and supply the triangle wave to the comparator 326.

The comparator 326 may compare an output voltage of the error amplifier 322 with the triangle wave and generate the first switching signal VPWM in response to a comparison result.

Figure 13:
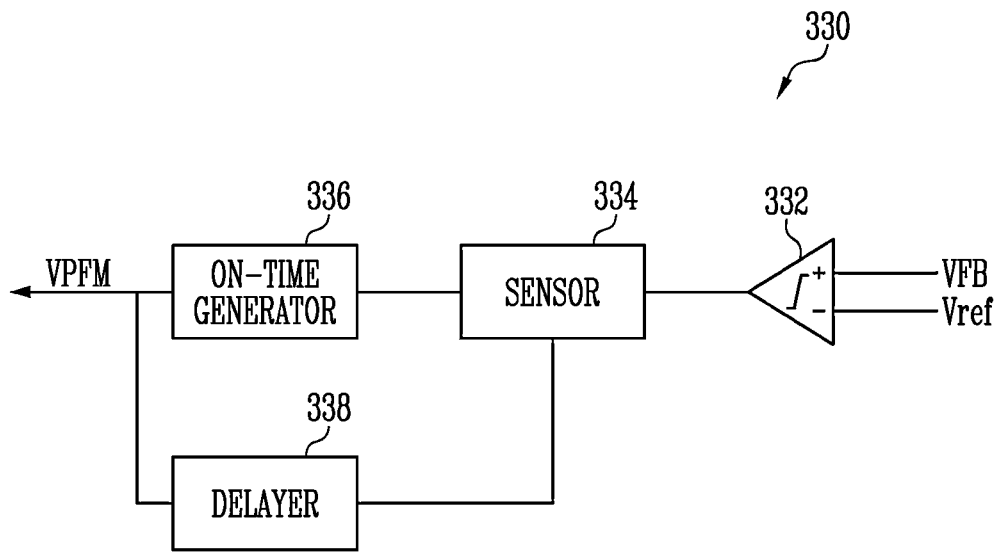
FIG. 13 is a diagram illustrating an embodiment of a second mode driver shown in FIG. 3.

FIG. 13 is a diagram illustrating an embodiment of the second mode driver shown in FIG. 3.

Referring to FIG. 13, the second mode driver 330 according to an embodiment of the disclosure may include a comparator 332, a sensor 334, an on-time generator 336, and a delayer 338.

The comparator 332 may compare the feedback voltage VFB and the reference voltage Vref and output a high voltage or a low voltage corresponding to a comparison result. For example, the comparator 332 may output the high voltage when the feedback voltage VFB is higher than the reference voltage Vref, and may output the low voltage in other cases.

The comparator 332 output the high voltage means that the output voltage Vout is a sufficiently high voltage. In this case, the on-time generator 336 and the like are not driven.

The comparator 332 output a low voltage may mean that the output voltage Vout is lower than a desired voltage. In this case, the on-time generator 336 may be driven.

The sensor 334 may sense whether the output of the comparator 332 is the high voltage or the low voltage and supply the sensing result to the on-time generator 336.

When the comparator 332 output the low voltage, the on-time generator 336 may generate the second switching signal VPFM so that the output voltage Vout may be increased. Here, the on-time generator 336 may control the on-time of the second switching signal VPFM using the on-time change signal AOT.

For example, when it is determined that the output load ILOAD is high, the on-time generator 336 may set the on-time of the second switching signal VPFM relatively long, and when it is determined that the output load ILOAD is low, the on-time generator 336 may set the on-time of the second switching signal VPFM relatively short.

The delayer 338 may delay the second switching signal VPFM and supply the delayed second switching signal VPFM to the sensor 334.

Figure 14:
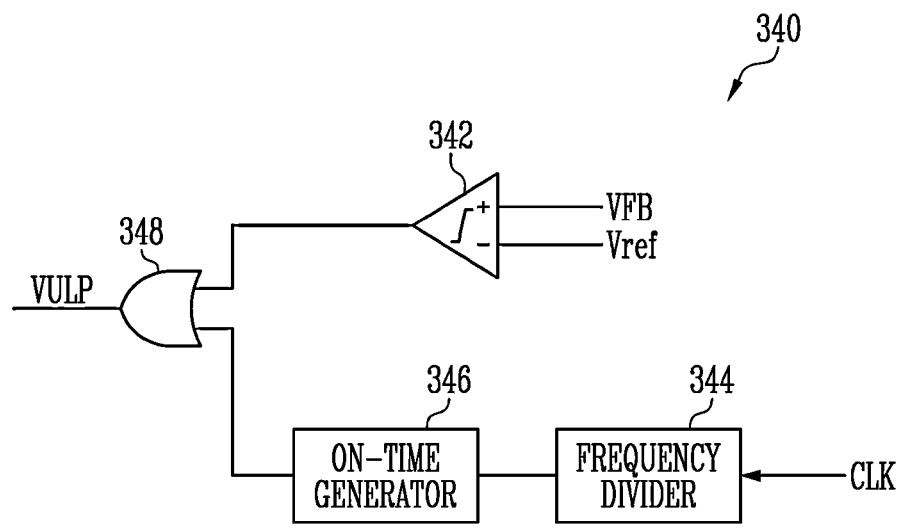
FIG. 14 is a diagram illustrating an embodiment of a third mode driver shown in FIG. 3.

FIG. 14 is a diagram illustrating an embodiment of the third mode driver shown in FIG. 3.

Referring to FIG. 14, the third mode driver 340 according to an embodiment of the disclosure may include a comparator 342, a frequency divider 344, an on-time generator 346, and a logic gate 348.

The comparator 342 may compare the feedback voltage VFB and the reference voltage Vref and output a high voltage or a low voltage corresponding to a comparison result. For example, the comparator 342 may output the high voltage when the feedback voltage VFB is higher than the reference voltage Vref, and may output the low voltage in other cases.

The comparator 332 output the high voltage means that the output voltage Vout is a sufficiently high voltage. When the high voltage is output from the comparator 332, the logic gate 348 outputs a high voltage as the third switching signal VULP.

In this case, when the third switching signal VULP is supplied to the driver 312, the first transistor Mp is a turn-off state. That is, the current is not supplied to the inductor L.

The comparator 332 output the low voltage means that the output voltage Vout is a voltage lower than a desired voltage. In this case, an output of the logic gate 348 may be controlled by an output of the on-time generator 346.

The frequency divider 344 may divide a clock signal CLK to decrease the frequency of the clock signal CLK. In this case, the third mode driver 340 may be driven by a clock signal of a low frequency.

The on-time generator 346 may generate a pulse signal at a constant frequency. A pulse signal of a certain frequency generated by the on-time generator 346 may be supplied to the driver 312 as the third switching signal VULP. Here, a frequency of the third switching signal VULP may be lower than a frequency of the second switching signal VPFM.

That is, the third mode driver 340 may supply the third switching signal VULP at a low frequency when the output load ILOAD is very low, thereby reducing power consumption.

Figure 15:
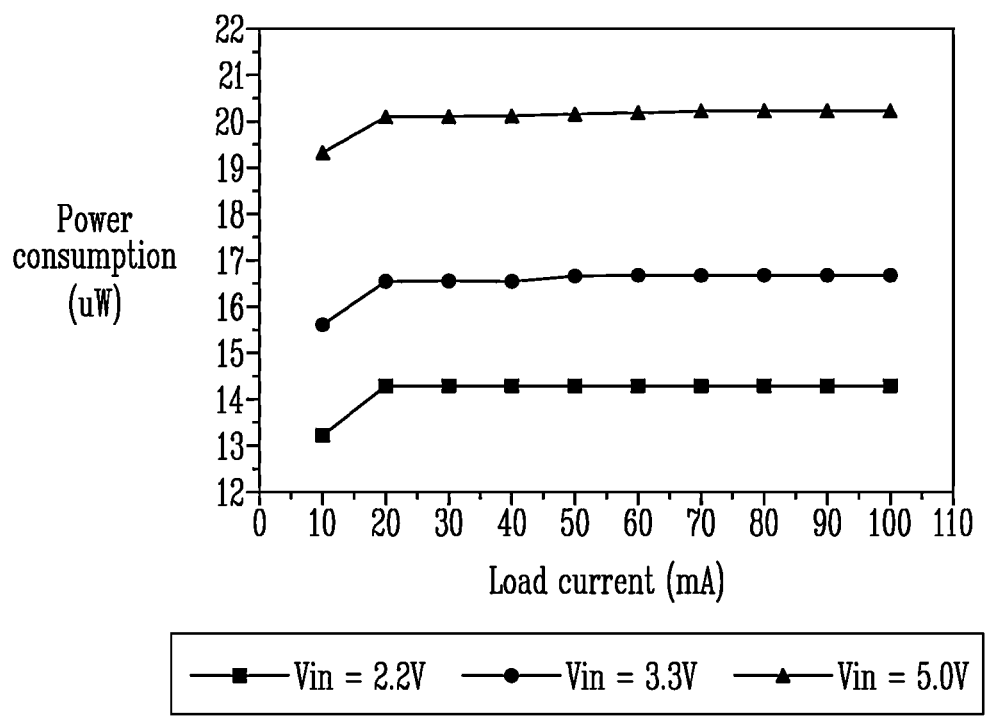
FIG. 15 is a graph illustrating a simulation of power consumption of the on-time checker shown in FIG. 4.

FIG. 15 is a graph illustrating a simulation of power consumption of the on-time checker shown in FIG. 4. In FIG. 15, an X-axis is a load current (mA), and a Y-axis is power consumption (μW). In addition, the input voltage Vin supplied to the on-time checker 360 is respectively set to 2.2V, 3.3V, and 5.0V.

Referring to FIG. 15, the power consumption of the on-time checker 360 may be highest at 5.0V and lowest at 2.2V. In addition, even though the load current increases at the same input voltage, the power consumption is maintained almost constant. The power consumption of the on-time checker 360 corresponding to the input voltage of 5.0V is approximately 20 μW. That is, the on-time checker 360 according to an embodiment of the disclosure may sense the output load ILOAD using the first switching signal VPWM while consuming low power.

Figure 16:
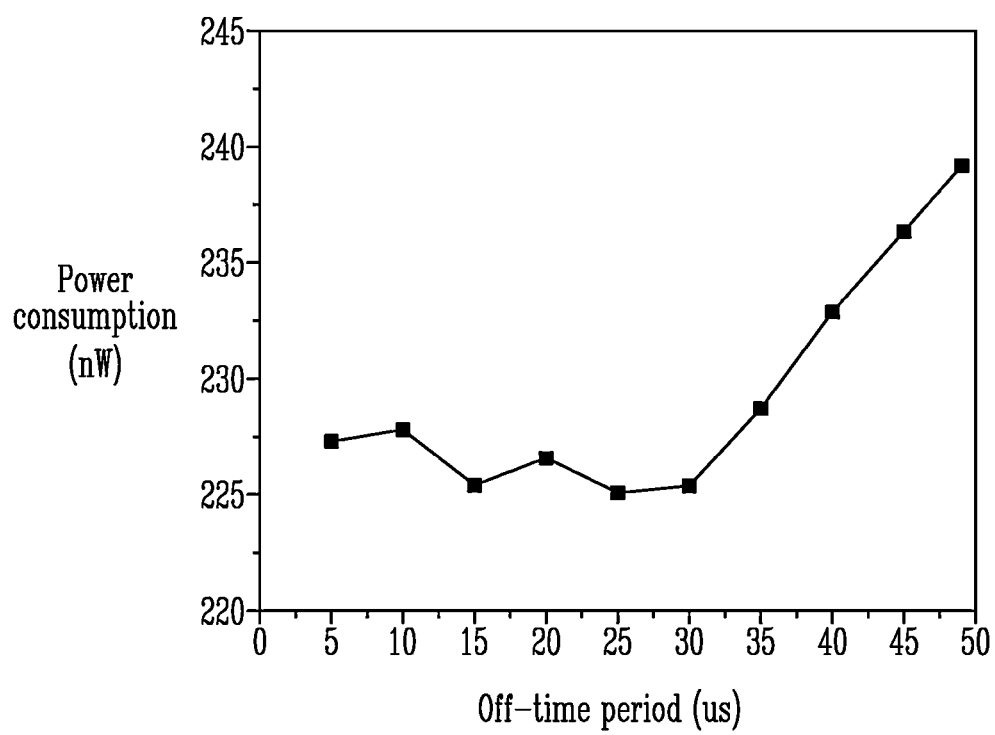
FIG. 16 is a graph illustrating a simulation of power consumption of the off-time checker shown in FIG. 4.

FIG. 16 is a graph illustrating a simulation of power consumption of the off-time checker shown in FIG. 4. In FIG. 16, an X-axis is the off-time period (μS) of the second switching signal VPFM, and a Y-axis is power consumption (nW).

Referring to FIG. 16, the power consumption of the off-time checker 390 may be different according to the off-time period. For example, when the off-time period is 30 μs or more, the power consumption may be increased. A power consumption range of the off-time checker 390 may be approximately 225 nW to 240 nW, and thus low power consumption may be accomplished. In addition, when the off-time period is set to 50 μs or more, the driving mode of the DC-DC converter 300 may be changed to the third mode ULP.

Figure 17:
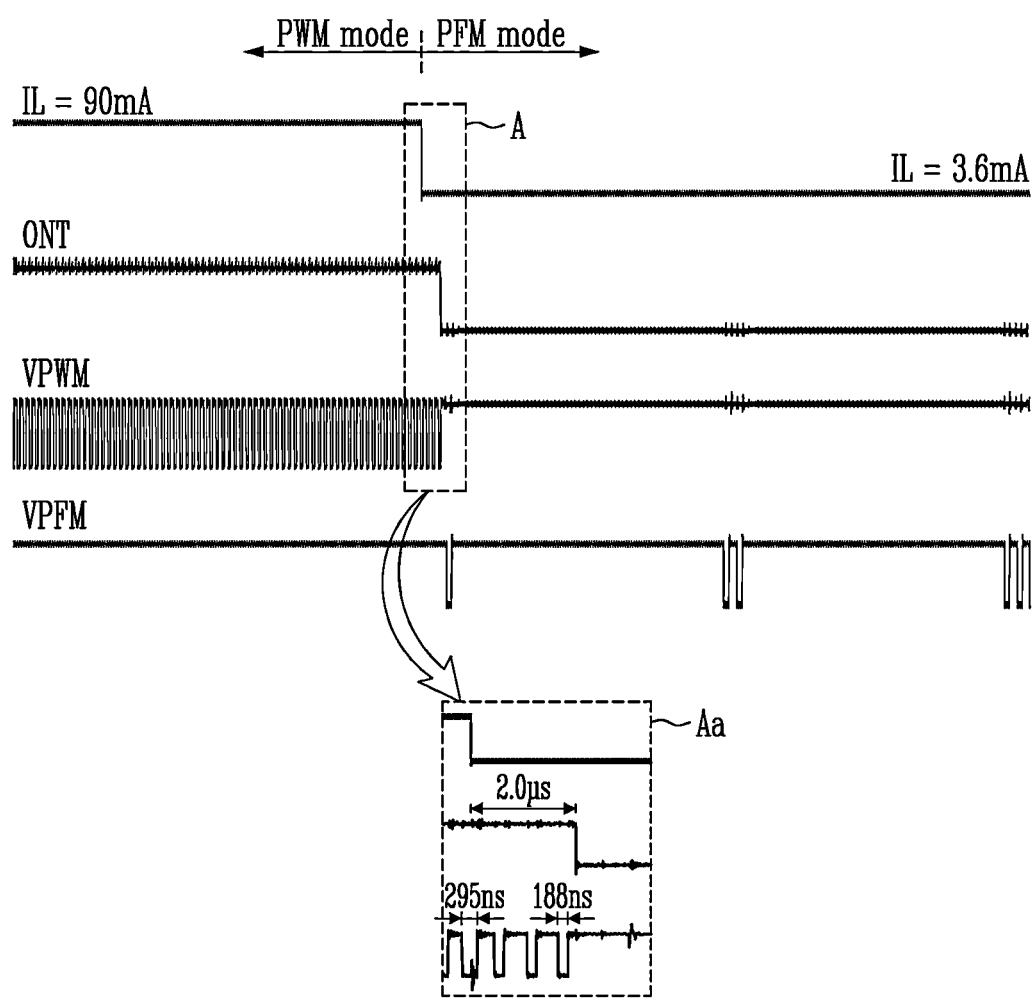
FIG. 17 is a simulation waveform diagram illustrating a process in which the DC-DC converter is changed from a first mode to a second mode.

FIG. 17 is a simulation waveform diagram illustrating a process in which an operation mode of the DC-DC converter is changed from the first mode to the second mode. In FIG. 17, Aa is an enlarged illustration of a portion A.

Referring to FIG. 17, when a load current IL (or the output load ILOAD) is changed from 90 mA to 3.6 mA, the operation mode of the DC-DC converter 300 may be changed from the first mode PWM mode to the second mode PFM mode.

For example, when the load current IL decreases, the on-time period of the second switching signal VPWM decreases from 295 ns to 188 ns. When the on-time period is shortened, the on-time control signal ONT is changed from a high voltage to a low voltage. Then, the operation mode of the DC-DC converter 300 may be changed from the first mode PWM mode to the second mode PFM mode.

Figure 18:
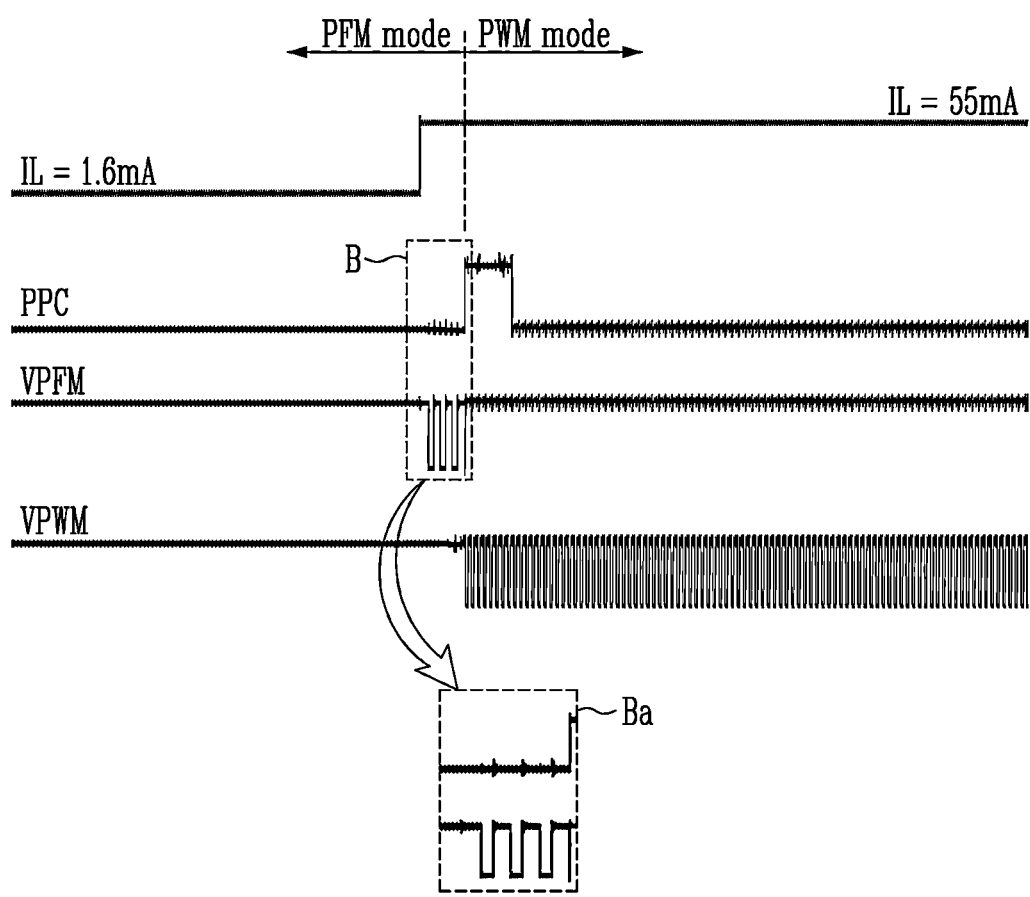
FIG. 18 is a simulation waveform diagram illustrating a process in which the DC-DC converter is changed from the second mode to the first mode.

FIG. 18 is a simulation waveform diagram illustrating a process in which the operation mode of the DC-DC converter is changed from the second mode to the first mode. In FIG. 18, Ba is an enlarged illustration of a portion B.

Referring to FIG. 18, when the load current IL or (the output load ILOAD) is changed from 1.6 mA to 55 mA, the operation mode of the DC-DC converter 300 may be changed from the second mode PFM mode to the first mode PWM mode.

When the load current IL is 1.6 mA, the DC-DC converter 300 is driven in the second mode PFM mode, and thus a first count control signal PPC maintains a low voltage (disable). In addition, when the load current IL is changed from 1.6 mA to 55 mA, the reference voltage Vref may be set higher than the feedback voltage VFB in the second mode driver 330 (that is, the comparator 332 of FIG. 13 outputs a low voltage output), the second switching signal VPFM may be repeatedly generated three or more times. In this case, the first counter 370 outputs an enable first count control signal PPC (that is, a high voltage), and the operation mode of the DC-DC converter 300 may be changed from the second mode PFM mode to the first mode PWM mode.

Thereafter, when the on-time checker 360 receives the first switching signal VFWM and the on-time control signal ONT is a high voltage, the first counter 370 may be initialized by the reset signal RSTP.

Figure 19:
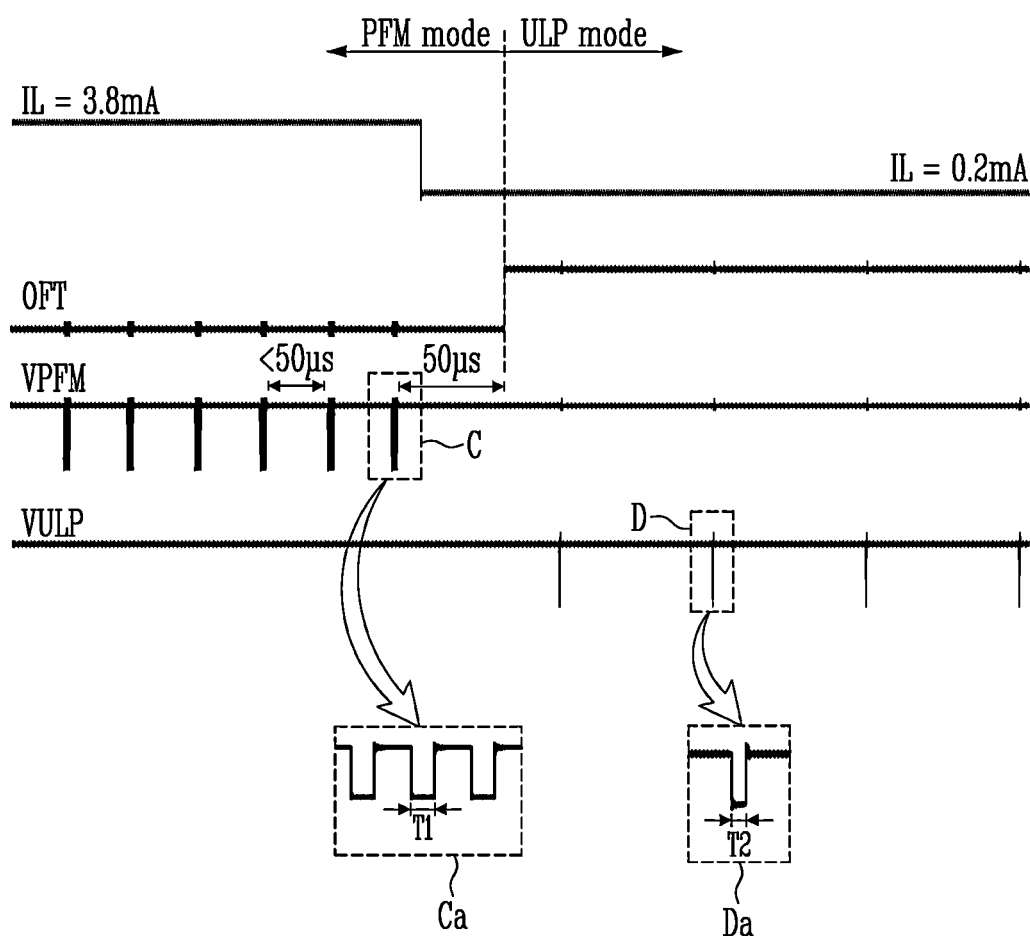
FIG. 19 is a simulation waveform diagram illustrating a process in which the DC-DC converter is changed from the second mode to a third mode.

FIG. 19 is a simulation waveform diagram illustrating a process in which the operation mode of the DC-DC converter is changed from the second mode to the third mode. In FIG. 19, Ca is an enlarge illustration of a portion C, and Da is an enlarge illustration of a portion D.

Referring to FIG. 19, when the load current IL (or the output load ILOAD) is changed from 3.8 mA to 0.2 mA, the operation mode of the DC-DC converter 300 may be changed from the second mode PFM mode to the third mode ULP mode.

When the load current IL is 3.8 mA, the DC-DC converter 300 is driven in the second mode PFM mode. At this time, the off-time period of the second switching signal VPFM is less than 50 µs, and the off-time control signal OFT maintains an enable (that is, low voltage) state.

When the load current IL decreases from 3.8 mA to 0.2 mA, the off-time period of the second switching signal VPFM increases to 50 µs or more, and the off-time control signal OFT is a disable (that is, high voltage) state. That is, when the load current IL is decreased from 3.8 mA to 0.2 mA, a disable off-time control signal OFT may be output from the off-time checker 390, and thus the DC-DC converter 300 may be driven in the third mode ULP mode.

In the third mode ULP mode, an on-time period T1 of the third switching signal VULP may be set shorter than an on-time period T2 of the second switching signal VPFM. In addition, the third switching signal VULP may have a frequency lower than that of the second switching signal VPFM. Therefore, when the DC-DC converter 300 is driven in the third mode ULP mode, the DC-DC converter 300 may be driven with low power consumption.

Figure 20:
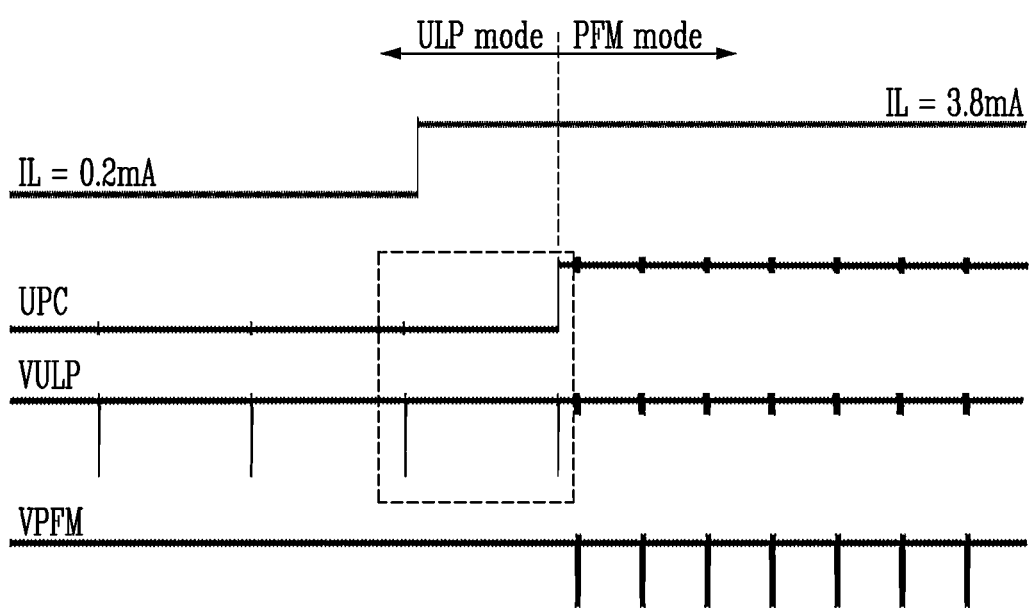
FIG. 20 is a simulation waveform diagram illustrating a process in which the DC-DC converter is changed from the third mode to the second mode.

FIG. 20 is a simulation waveform diagram illustrating a process in which the operation mode of the DC-DC converter is changed from the third mode to the second mode.

Referring to FIG. 20, when the load current IL (or the output load ILOAD) is changed from 0.2 mA to 3.8 mA, the operation mode of the DC-DC converter 300 may be changed from the third mode ULP mode to the second mode PFM mode.

When the load current IL is 0.2 mA, the DC-DC converter 300 is driven in the third mode ULP mode, and thus the second count control signal UPC maintains a low voltage (disable). In addition, when the load current IL is changed from 0.2 mA to 3.8 mA, the reference voltage Vref may be higher than the feedback voltage VFB in the third mode driver 340 (that is, the comparator 342 of FIG. 14 outputs a low voltage), and the third switching signal VULP may be repeatedly input to the second counter 380 twice or more.

In this case, the second counter 380 may output an enable second count control signal UPC (that is, a high voltage), and the operation mode of the DC-DC converter 300 may be changed from the third mode ULP mode to the second mode PFM mode.

Figure 21:
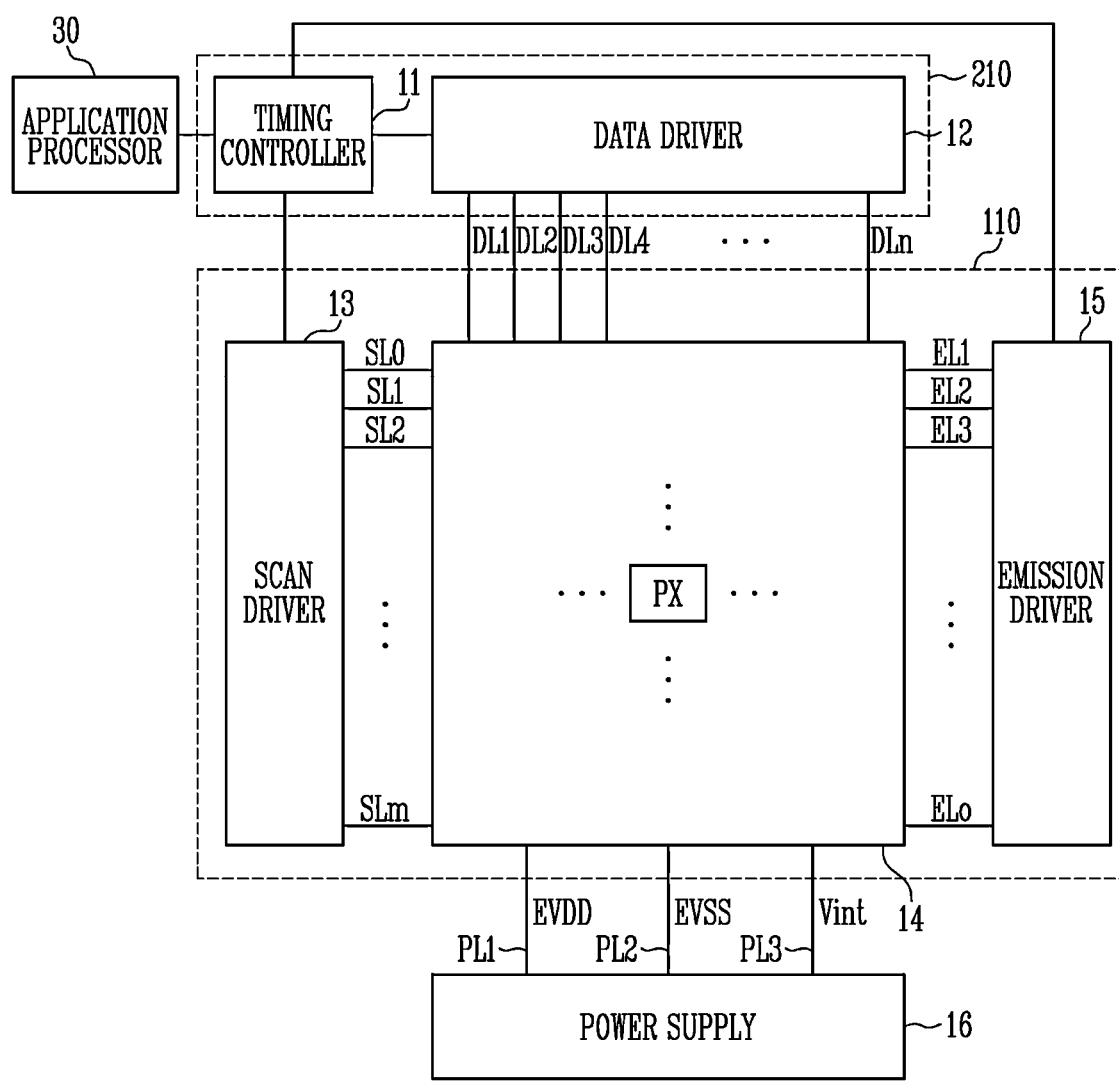
FIG. 21 is a diagram illustrating a display device according to an embodiment of the disclosure.

FIG. 21 is a diagram illustrating a display device according to an embodiment of the disclosure.

Referring to FIG. 21, the display device according to an embodiment of the disclosure may include a display driver 210, a display unit 110, and a power supply 16. The display driver 210 may include a timing controller 11 and a data driver 12, and the display unit 110 may include a pixel unit 14, a scan driver 13 and an emission driver 15. Here, whether each functional unit is integrated into one IC, into a plurality of ICs, or mounted on a substrate may be variously configured according to a specification of the display device.

The timing controller 11 may receive data and timing signals corresponding to a frame period from an application processor 30. The data may be supplied to pixels connected to one horizontal line at a time in each horizontal period. The horizontal line may refer to a pixel row in which pixels connected to the same scan line are positioned.

The timing controller 11 may render the data to correspond to the specification of the display device or the pixel unit 14. In addition, the timing controller 11 may provide a data control signal to the data driver 12. In addition, the timing controller 11 may provide a scan control signal to the scan driver 13.

The data driver 12 may generate data signals to be provided to data lines DL1 to DLn (for example, n is a natural number) using the data and the data control signal received from the timing controller 11.

The scan driver 13 may generate scan signals to be provided to scan lines SL0 to SLm (for example, m is a natural number) using a clock signal, a scan start signal, and the like received from the timing controller 11. The scan driver 13 may sequentially supply scan signals having a turn-on level of pulse to the scan lines SL0 to SLm. For example, the scan driver 13 may sequentially supply turn-on level of scan signals to the scan lines SL0 to SLm at a cycle corresponding to a cycle of a horizontal synchronization signal Hsync during an active period in which the data are supplied. The scan driver 13 may include scan stages each of which includes a shift register. The scan driver 13 may generate the scan signals in a method of sequentially transferring the scan start signal which is a pulse form of a turn-on level to a next scan stage under control of the clock signal.

The emission driver 15 may generate emission control signals to be provided to emission control lines EL1 to ELo using a clock signal, an emission start signal, and the like received from the timing controller 11. The emission driver 15 may sequentially supply emission control signals having a turn-off level of pulse to the emission control lines EL1 to ELo. The emission driver 15 may include emission stages each of which includes a shift register. The emission driver 15 may generate the emission control signals in a method of sequentially transferring the emission start signal which is a pulse form of a turn-off level to a next emission stage according to control of the clock signal.

The pixel unit 14 includes the pixels PX. Each of the pixels PX may be connected to corresponding data line and scan line. For example, a pixel PXij (refer to FIG. 22) may be connected to an i-th scan line and a j-th data line. The pixels PX may be selected and receive the data signal when the scan signal is supplied to the scan line to which the pixels PX are connected. The pixels PX may generate light of a predetermined luminance in response to the data signal.

The power supply 16 may generate various power required to drive the display device. For example, the power supply 16 may generate first driving power EVDD, second driving power EVSS, and initialization power Vint. To this end, the power supply 16 may include the DC-DC converter 300 shown in FIG. 3. The DC-DC converter 300 may be included in the power supply 16 and may generate at least one of the first driving power EVDD, the second driving power EVSS, and the initialization power Vint.

The first driving power EVDD may be power that supplies a driving current to the pixels PX. The second driving power EVSS may be power that receives the driving current from the pixels PX. During a period in which the pixels PX emit light, the first driving power EVDD may be a voltage higher than that of the second driving power EVSS. The initialization power Vint is power that initializes a gate electrode of a driving transistor and an anode of a light emitting element LD (refer to FIG. 22) included in each of the pixels PX.

The first power EVDD generated by the power supply 16 may be supplied to a first power line PL1, the second driving power EVSS may be supplied to a second power line PL2, and the initialization power Vint may be supplied to a third power line PL3. Each of the first power line PL1, the second power line PL2, and the third power line PL3 may be connected to the pixels PX, but an embodiment of the disclosure is not limited thereto.

In an embodiment, the first power line PL1 may include a plurality of power lines, and the plurality of power lines may be connected to different pixels PX. In an embodiment, the second power line PL2 may include a plurality of power lines, and the plurality of power lines may be connected to different pixels PX. In an embodiment, the third power line PL3 may include a plurality of power lines, and the plurality of power lines may be connected to different pixels PX. That is, in an embodiment of the disclosure, each of the pixels PX may be connected to any one of the first power line PL1, any one of the second power line PL2, and any one of the third power line PL3.

Figure 22:
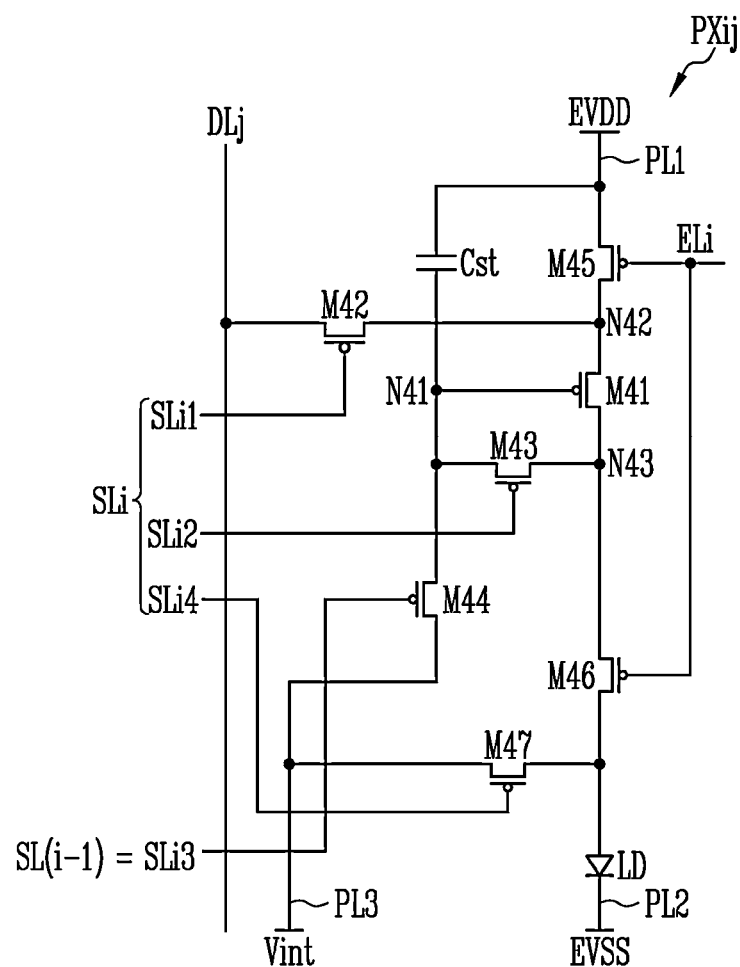
FIG. 22 is a diagram illustrating a pixel according to an embodiment of the disclosure.

FIG. 22 is a diagram illustrating a pixel according to an embodiment of the disclosure.

Referring to FIG. 22, the pixel PXij according to an embodiment of the disclosure includes transistors M41, M42, M43, M44, M45, M46, and M47, a storage capacitor Cst, and the light emitting element LD.

Hereinafter, a circuit including a P-type transistor is described as an example. However, those skilled in the art will be able to design a circuit including an N-type transistor by altering a polarity of a voltage applied to a gate terminal. Similarly, those skilled in the art will be able to design a circuit including a combination of a P-type transistor and an N-type transistor. The transistor may be configured in various forms such as a thin film transistor (TFT), a field effect transistor (FET), and a bipolar junction transistor (BJT).

The first transistor M41 may have a gate electrode connected to a first node N41, a first electrode connected to a second node N42, and a second electrode connected to a third node N43. The first transistor M41 may be referred to as a driving transistor.

The second transistor M42 may have a gate electrode connected to a scan line SLi1, a first electrode connected to a data line DLj, and a second electrode connected to the second node N42. The second transistor M42 may be referred to as a scan transistor.

The third transistor M43 may have a gate electrode connected to a scan line SLi2, a first electrode connected to the third node N43, and a second electrode connected to the first node N41. The third transistor M43 may be referred to as a diode connection transistor.

The fourth transistor M44 may have a gate electrode connected to a scan line SLi3, a first electrode connected to the first node N41, and a second electrode connected to the third power line PL3. The fourth transistor M44 may be referred to as a gate initialization transistor.

The fifth transistor M45 may have a gate electrode connected to an i-th emission control line Eli, a first electrode connected to the first power line PL1, and a second electrode connected to the second node N42. The fifth transistor M45 may be referred to as an emission transistor.

The sixth transistor M46 may have the gate electrode connected to the i-th emission control line ELi, a first electrode connected to the third node N43, and a second electrode connected to an anode of the light emitting element LD. The sixth transistor M46 may be referred to as an emission transistor. In another embodiment, the gate electrode of the sixth transistor M46 may be connected to the emission control line different from the emission control line connected to the gate electrode of the fifth transistor M45.

The seventh transistor M47 may have a gate electrode connected to a scan line SLi4, a second electrode connected to the third power line PL3, and a first electrode connected to the anode of the light emitting element LD. The seventh transistor M47 may be referred to as a light emitting element initialization transistor.

A first electrode of the storage capacitor Cst may be connected to the first power line PL1 and a second electrode may be connected to the first node N41.

The anode of the light emitting element LD may be connected to the second electrode of the sixth transistor M46 and a cathode may be connected to the second power line PL2. The light emitting element LD may be a light emitting diode. The light emitting element LD may include one of an organic light emitting element (organic light emitting diode), an inorganic light emitting element (inorganic light emitting diode), a quantum dot/well light emitting element (quantum dot/well light emitting diode), or the like. In addition, although only one light emitting element LD is provided in each pixel in the present embodiment, a plurality of light emitting elements may be provided in each pixel in another embodiment. At this time, the plurality of light emitting elements may be connected in series, parallel, series-parallel, or the like.

Figure 23:
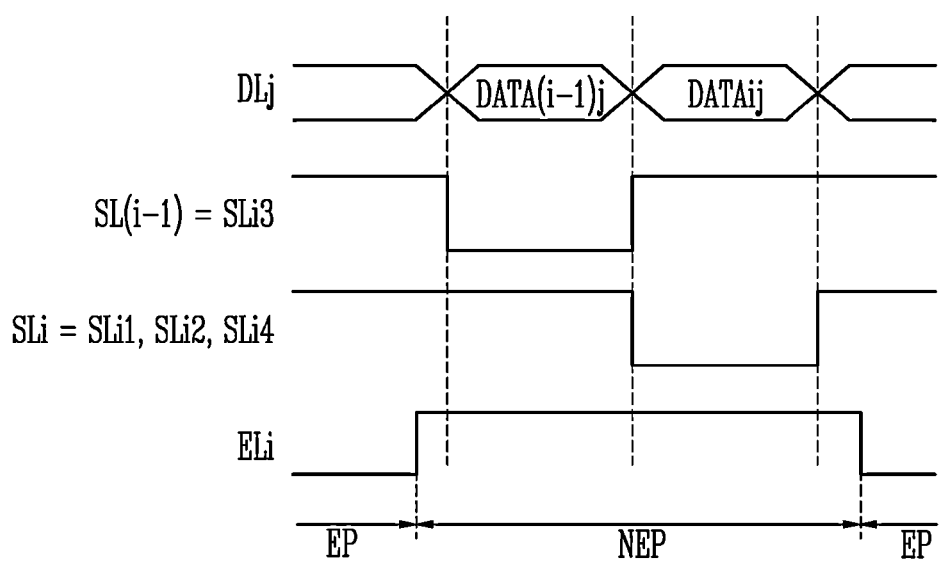
FIG. 23 is a diagram illustrating a method of driving the pixel shown in FIG. 22.

FIG. 23 is a diagram illustrating a method of driving the pixel shown in FIG. 22.

Hereinafter, for convenience of description, it is assumed that the scan lines SLi1, SLi2, and SLi4 are i-th scan lines SLi and the scan line SLi3 is an (i−1)-th scan line SL(i−1). However, a connection relationship of the scan lines SLi1, SLi2, SLi3, and SLi4 may be variously altered according to embodiments. For example, the scan line SLi4 may be the (i−1)-th scan line or an (i+1)-th scan line.

First, an emission control signal of a turn-off level (logic high level) is applied to the i-th emission control line ELi, a data signal DATA(i−1)j for an (i−1)-th pixel is applied to the data line DLj, and a scan signal of a turn-on level (logic low level) is applied to the scan line SLi3. The high/low of the logic level may vary according to whether a transistor is a P-type or an N-type.

At this time, since a scan signal of a turn-off level is applied to the scan lines SLi1 and SLi2, the second transistor M42 is turned off and the data signal DATA(i−1)j is prevented from being input to the pixel PXij.

At this time, since the fourth transistor M44 is turned on, the first node N41 is connected to the third power line PL3, and a voltage of the first node N41 is initialized. Since the emission control signal of the turn-off level is applied to the emission control line Ei, the transistors M45 and M46 are turned off, and unnecessary light emission of the light emitting element LD according to an initialization voltage application process is prevented.

Next, a data signal DATAij for the i-th pixel PXij is applied to the data line DLj, and the scan signal of the turn-on level is applied to the scan lines SLi1 and SLi2. Accordingly, the transistors M42, M41, and M43 are turned on, and the data line DLj and the first node N41 are electrically connected with each other. Therefore, a compensation voltage obtained by subtracting a threshold voltage of the first transistor M41 from the data signal DATAij is applied to the second electrode of the storage capacitor Cst (that is, the first node N41), and the storage capacitor Cst maintains a voltage corresponding to a difference between the first power driving power EVDD and the compensation voltage. Such a period may be referred to as a threshold voltage compensation period or a data writing period.

In addition, when the scan line SLi4 is the i-th scan line, since the seventh transistor M47 is turned on, the anode of the light emitting element LD and the third power line PL3 are connected with each other, and the light emitting element LD is initialized to the initialization power Vint.

Thereafter, as the emission control signal of the turn-on level is applied to the i-th emission control line ELi, the transistors M45 and M46 may be turned on. Therefore, a current path connecting the first power line PL1, the fifth transistor M45, the first transistor M41, the sixth transistor M46, the light emitting element LD, and the second power line PL2 is formed.

A driving current amount flowing from the first electrode to the second electrode of the first transistor M41 is adjusted according to the voltage stored in the storage capacitor Cst. The light emitting element LD emits light with a luminance corresponding to the driving current amount. The light emitting element LD emits light until the emission control signal of the turn-off level is applied to the emission control line Ei.

When the emission control signal is the turn-on level, pixels receiving the corresponding emission control signal may be in a display state. Therefore, a period in which the emission control signal is the turn-on level may be referred to as an emission period EP (or an emission allowable period). In addition, when the emission control signal is the turn-off level, pixels receiving the corresponding emission control signal may be in a non-display state. Therefore, a period in which the emission control signal is the turn-off level may be referred to as a non-emission period NEP (or an emission disallowable period).

The non-emission period NEP described with reference to FIG. 23 is for preventing the pixel PXij from emitting light with an undesired luminance during the initialization period and the data writing period.

One or more non-emission periods NEP may be additionally provided while the data signal written to the pixel PXij is maintained (for example, one frame period). This may be for effectively expressing a low grayscale by reducing the emission period EP of the pixel PXij, or for smoothly blurring a motion of an image.

Figure 24:
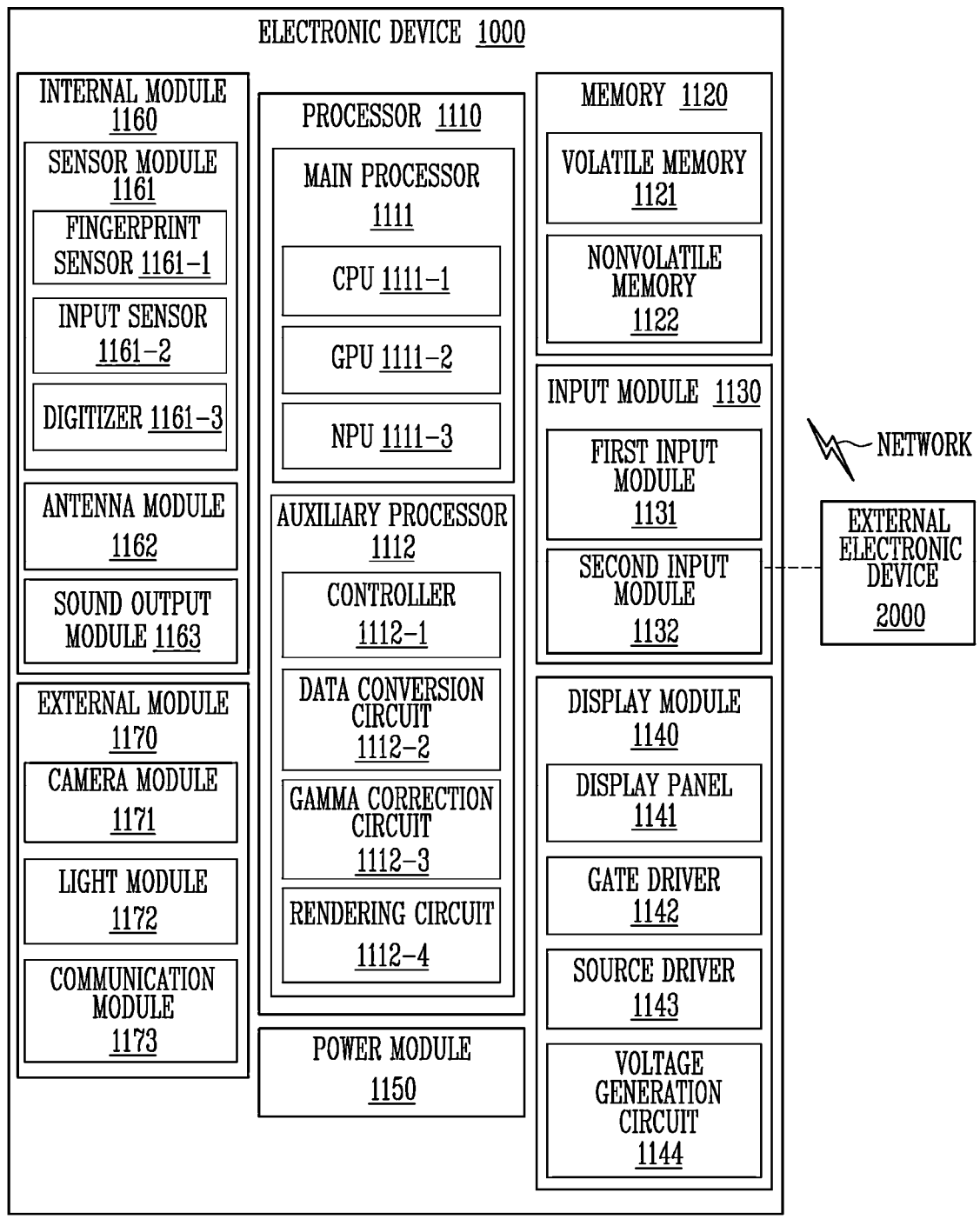
FIG. 24 is a diagram illustrating an electronic device according to an embodiment of the disclosure.

FIG. 24 is a diagram illustrating an electronic device according to an embodiment of the disclosure.

Referring to FIG. 24, the electronic device 1000 outputs various pieces of information through a display module 1140. When a processor 1110 executes an application stored in a memory 1120, the display module 1140 provides application information to a user through a display panel 1141.

The processor 1110 obtains an external input through an input module 1130 or a sensor module 1161 and executes an application corresponding to the external input. For example, when the user selects a camera icon (or a camera application icon) displayed on the display panel 1141, the processor 1110 obtains a user input through an input sensor 1161-2 and activates a camera module 1171. The processor 1110 transmits image data corresponding to a captured image obtained through the camera module 1171 to the display module 1140. The display module 1140 may display an image corresponding to the captured image through the display panel 1141.

As another example, when personal information authentication is executed in the display module 1140, a fingerprint sensor 1161-1 obtains input fingerprint information as input data. The processor 1110 compares input data obtained through the fingerprint sensor 1161-1 with authentication data stored in a memory 1120 and executes an application according to a comparison result. The display module 1140 may display information executed according to a logic of the application through the display panel 1141. The fingerprint sensor 1161-1 may be disposed to obtain the fingerprint information from the entire area of the display module 1140 (or the display panel 1141).

As still another example, when a music streaming icon displayed on the display module 1140 is selected, the processor 1110 obtains a user input through the input sensor 1161-2 and activates a music streaming application stored in the memory 1120. When a music execution command is input in the music streaming application, the processor 1110 activates a sound output module 1163 to provide sound information corresponding to the music execution command to the user.

In the above, an operation of the electronic device 1000 is briefly described. Hereinafter, a configuration of the electronic device 1000 is described in detail. Some of configurations of the electronic device 1000 to be described later may be integrated and provided as one configuration, and one configuration may be separated into two or more configurations and provided.

The electronic device 1000 may communicate with an external electronic device 2000 through a network (for example, a short-range wireless communication network or a long-range wireless communication network). According to an embodiment, the electronic device 1000 may include a processor 1110, a memory 1120, an input module 1130, a display module 1140, a power module 1150, an internal module 1160, and an external module 1170. According to an embodiment, in the electronic device 1000, at least one of the above-described components may be omitted or one or more other components may be added. According to an embodiment, some of the above-described components (for example, the sensor module 1161, an antenna module 1162, or the sound output module 1163) may be integrated into another component (for example, the display module 1140).

The processor 1110 may execute software to control at least another component (for example, a hardware or software component) of the electronic device 1000 connected to the processor 1110, and perform various data processing or operations. According to an embodiment, as at least a portion of the data processing or operation, the processor 1110 may store a command or data received from another component (for example, the input module 1130, the sensor module 1161, or a communication module 1173) in a volatile memory 1121, process the command or the data stored in the volatile memory 1121, and store result data in a nonvolatile memory 1122.

The processor 1110 may include a main processor 1111 and an auxiliary processor 1112. The main processor 1111 may include one or more of a central processing unit (CPU) 1111-1 or an application processor which is not shown. The main processor 1111 may further include any one or more of a central processing unit (CPU), a graphic processing unit (GPU) 1111-2, a communication processor which is not shown, and an image signal processor which is not shown. The main processor 1111 may further include a neural processing unit (NPU) 1111-3. The NPU 1111-3 is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 1112 may include a controller 1112-1. The controller 1112-1 may include an interface conversion circuit and a timing control circuit. For example, the controller 1112-1 may include the timing controller 11 shown in FIG. 21. The controller 1112-1 receives an image signal from the main processor 1111, converts a data format of the image signal to correspond to an interface specification with the display module 1140, and outputs image data. The controller 1112-1 may output various control signals required for driving the display module 1140.

The auxiliary processor 1112 may further include a data conversion circuit 1112-2, a gamma correction circuit 1112-3, a rendering circuit 1112-4, a touch control circuit which is not shown, and the like. The data conversion circuit 1112-2 may receive the image data from the controller 1112-1, compensate the image data to display an image with a desired luminance according to a characteristic of the electronic device 1000, a setting of the user, or the like, or convert the image data for reduction of power consumption, afterimage compensation, or the like.

The gamma correction circuit 1112-3 may convert the image data, a gamma reference voltage, or the like so that the image displayed on the electronic device 1000 has a desired gamma characteristic. The rendering circuit 1112-4 may receive the image data from the controller 1112-1 and render the image data in consideration of a pixel disposition or the like of the display panel 1141 applied to the electronic device 1000.

The touch control circuit may supply a touch signal to the input sensor 1161-2 and receive a sensing signal from the input sensor 1161-2 in response to the touch signal.

At least one of the data conversion circuit 1112-2, the gamma correction circuit 1112-3, the rendering circuit 1112-4, and the touch control circuit may be integrated into another component (for example, the main processor 1111 or the controller 1112-1). At least one of the data conversion circuit 1112-2, the gamma correction circuit 1112-3, and the rendering circuit 1112-4 may be integrated into a source driver 1143 to be described later.

The memory 1120 may store various data used by at least one component (for example, the processor 1110 or the sensor module 1161) of the electronic device 1000, and input data or output data for a command related thereto. In addition, various setting data corresponding to setting of the user may be stored in the memory 1120. The memory 1120 may include at least one of the volatile memory 1121 and the nonvolatile memory 1122.

The input module 1130 may receive a command or data to be used by a component (for example, the processor 1110, the sensor module 1161, or the sound output module 1163) of the electronic device 1000 from an outside (for example, the user or the external electronic device 2000) of the electronic device 1000.

The input module 1130 may include a first input module 1131 to which a command or data is input from the user and a second input module 1132 to which a command or data is input from the external electronic device 2000. The first input module 1131 may include a microphone, a mouse, a keyboard, a key (for example, a button), or a pen (for example, a passive pen or an active pen). The second input module 1132 may support a designated protocol capable of connecting to the external electronic device 2000 by wire or wirelessly. According to an embodiment, the second input module 1132 may include a high definition multimedia interface (HDMI), a universal serial bus (USB) interface, an SD card interface, or an audio interface. The second input module 1132 may include a connector capable of physically connecting to the external electronic device 2000, for example, an HDMI connector, a USB connector, an SD card connector, or an audio connector (for example, a headphone connector).

The display module 1140 visually provides information to the user. The display module 1140 may include the display panel 1141, a gate driver 1142, and the source driver 1143. The display module 1140 may further include a window, a chassis, and a bracket for protecting the display panel 1141. Such a display module 1140 may include the display device shown in FIG. 21.

The display panel 1141 (or a display) may include a liquid crystal display panel, an organic light emitting display panel, or an inorganic light emitting display panel, and a type of the display panel 1141 is not particularly limited. The display panel 1141 may be a rigid type or a flexible type that may be rolled or folded. The display module 1140 may further include a supporter, a bracket, a heat dissipation member, or the like that supports the display panel 1141.

The display panel 1141 may receive the image data from the auxiliary processor 1112, and may display an image while controlling a current amount supplied from the first driving power EVDD to the second driving power EVSS via the pixels PX in response to the image data.

The gate driver 1142 may be mounted on the display panel 1141 as a driving chip. In addition, the gate driver 1142 may be integrated in the display panel 1141. For example, the gate driver 1142 may include an amorphous silicon TFT gate driver circuit (ASG), a low temperature polycrystalline silicon (LTPS) TFT gate driver circuit, or an oxide semiconductor TFT gate driver circuit (OSG) which are formed in the display panel 1141. The gate driver 1142 receives a control signal from the controller 1112-1 and outputs scan signals to the display panel 1141 in response to the control signal. The gate driver 1142 may include the scan driver 13 shown in FIG. 21.

The display module 1140 may further include an emission driver. The emission driver outputs an emission control signal to the display panel 1141 in response to the control signal received from the controller 1112-1. The emission driver may be formed separately from the gate driver 1142 or may be integrated into the gate driver 1142. The emission driver may include the emission driver 15 shown in FIG. 21.

The source driver 1143 receives a control signal from the controller 1112-1, converts image data into an analog voltage (for example, a data signal) in response to the control signal, and then outputs the data signals to the display panel 1141. The source driver 1143 may include the data driver 12 shown in FIG. 21.

The source driver 1143 may be integrated into another component (for example, the controller 1112-1). A function of the interface conversion circuit and the timing control circuit of the controller 1112-1 described above may be integrated into the source driver 1143.

The display module 1140 may further include a voltage generation circuit 1144. The voltage generation circuit 1144 may output various voltages required for driving the display panel 1141. For example, the voltage generation circuit 1144 may include the power supply 16 shown in FIG. 21. The voltage generation circuit 1144 may include the DC-DC converter 300 shown in FIG. 3.

In an embodiment, the display panel 1141 may include a plurality of pixel columns each including a plurality of pixels.

In an embodiment, the source driver 1143 may convert data corresponding to red (R), green (G), and blue (B) included in the image data received from the processor into a red data signal (or data voltage), a green data signal, and the blue data signal, and may provide the red data signal, the green data signal, and the blue data signal to the plurality of pixel columns included in the display panel 1141 during one horizontal period.

The power module 1150 supplies power to a component of the electronic device 1000. The power module 1150 may include a battery that charges a power voltage. The battery may include a non-rechargeable primary cell, and a rechargeable secondary cell or fuel cell. The power module 1150 may include a power management integrated circuit (PMIC). The PMIC supplies optimized power to each of the above-described module and a module to be described later. The power module 1150 may include a wireless power transmission/reception member electrically connected to the battery. The wireless power transmission/reception member may include a plurality of antenna radiators of a coil form.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input by a body of the user or an input by a pen from the first input module 1131, and may generate an electrical signal or a data value corresponding to the input. The sensor module 1161 may include at least one of a fingerprint sensor 1161-1, an input sensor 1161-2, and a digitizer 1161-3.

The fingerprint sensor 1161-1 may generate a data value corresponding to a fingerprint of the user. The fingerprint sensor 1161-1 may include any one of an optical type fingerprint sensor or a capacitive type fingerprint sensor.

The input sensor 1161-2 may generate a data value corresponding to coordinate information of the input by the body of the user or the pen. The input sensor 1161-2 generates a capacitance change amount by the input as the data value. The input sensor 1161-2 may sense an input by the passive pen or may transmit/receive data to and from the active pen.

The input sensor 1161-2 may measure a biometric signal such as blood pressure, water, or body fat. For example, when the user touches a sensor layer or a sensing panel with a body part and does not move during a certain time, the input sensor 1161-2 may sense the biometric signal based on a change of an electric field by the body part and output information desired by the user to the display module 1140.

The digitizer 1161-3 may generate a data value corresponding to coordinate information of the input by the pen. The digitizer 1161-3 generates an electromagnetic change amount by the input as the data value. The digitizer 1161-3 may sense the input by the passive pen or may transmit/receive data to and from the active pen.

At least one of the fingerprint sensor 1161-1, the input sensor 1161-2, and the digitizer 1161-3 may be implemented as the sensor layer formed on the display panel 1141 through a continuous process. At least one of the fingerprint sensor 1161-1, the input sensor 1161-2, and the digitizer 1161-3 may be disposed above the display panel 1141, and any one of the fingerprint sensor 1161-1, the input sensor 1161-2, and the digitizer 1161-3, for example, the digitizer 1161-3 may be disposed below the display panel 1141.

At least two of the fingerprint sensor 1161-1, the input sensor 1161-2, and the digitizer 1161-3 may be formed to be integrated into one sensing panel through the same process. When at least two of the fingerprint sensor 1161-1, the input sensor 1161-2, and the digitizer 1161-3 are integrated into one sensing panel, the sensing panel may be disposed between the display panel 1141 and a window disposed above the display panel 1141. According to an embodiment, the sensing panel may be disposed on the window, and a position of the sensing panel is not particularly limited.

At least one of the fingerprint sensor 1161-1, the input sensor 1161-2, and the digitizer 1161-3 may be embedded in the display panel 1141. That is, at least one of the fingerprint sensor 1161-1, the input sensor 1161-2, and the digitizer 1161-3 may be simultaneously formed through a process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting a signal or power to an outside or receiving a signal or power from an outside. According to an embodiment, the communication module 1173 may transmit a signal to an external electronic device or receive a signal from an external electronic device through an antenna suitable for a communication method. An antenna pattern of the antenna module 1162 may be integrated into one configuration (for example, the display panel 1141) of the display module 1140 or the input sensor 1161-2.

The sound output module 1163 is a device for outputting a sound signal to an outside of the electronic device 1000, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 1163 may be integrated into the display module 1140.

The camera module 1171 may capture a still image and a moving image. According to an embodiment, the camera module 1171 may include one or more lenses, an image sensor, or an image signal processor. The camera module 1171 may further include an infrared camera capable of measuring presence or absence of the user, a position of the user, a gaze of the user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000 and communication performance through the established communication channel. The communication module 1173 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 1173 may communicate with the external electronic device 2000 through a short-range communication network such as Bluetooth, WiFi direct, or infrared data association (IrDA), or a long-range communication network such as a cellular network, the Internet, or a computer network (for example, LAN or WAN). The above-described various types of communication modules 1173 may be implemented as a single chip or as separate chips.

The input module 1130, the sensor module 1161, the camera module 1171, and the like may be used to control an operation of the display module 1140 in conjunction with the processor 1110.

The processor 1110 outputs a command or data to the display module 1140, the sound output module 1163, the camera module 1171, or the light module 1172 based on input data received from the input module 1130. For example, the processor 1110 may generate image data in response to the input data applied through a mouse, an active pen, or the like and output the image data to the display module 1140, or generate command data in response to the input data and output the command data to the camera module 1171 or the light module 1172. When the input data is not received from the input module 1130, the processor 1110 may convert an operation mode of the electronic device 1000 to a low power mode or a sleep mode to reduce power consumption in the electronic device 1000.

The processor 1110 outputs a command or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and then execute an application according to a comparison result. The processor 1110 may execute the command based on sensing data sensed by the input sensor 1161-2 or the digitizer 1161-3 or output corresponding image data to the display module 1140. When the sensor module 1161 includes a temperature sensor, the processor 1110 may receive temperature data for a measured temperature from the sensor module 1161 and further perform luminance correction or the like on the image data based on the temperature data.

The processor 1110 may receive measurement data for the presence of the user, the position of the user, the gaze of the user, and the like, from the camera module 1171. The processor 1110 may further perform luminance correction or the like on the image data based on the measurement data. For example, the processor 1110 determining the presence or absence of the user through an input from the camera module 1171 may output image data of which a luminance is corrected through the data conversion circuit 1112-2 or the gamma correction circuit 1112-3 to the display module 1140.

Some of the above-described components may be connected to each other through a communication method between peripheral devices, for example, a bus, general purpose input/output (GPIO), a serial peripheral interface (SPI), a mobile industry processor interface (MIPI), or an ultra-path interconnect (UPI) link to exchange a signal (for example, a command or data) with each other. The processor 1110 may communicate with the display module 1140 through a mutually agreed interface, for example, may use any one of the above-described communication methods, and is not limited to the above-described communication method.

Although the above has been described with reference to the embodiments of the disclosure, those skilled in the art will understand that the disclosure may be variously modified and changed without departing from the spirit and scope of the disclosure described in the claims.

What is claimed is:

1. A DC-DC converter comprising:
   a voltage generator configured to generate an output voltage by converting an input voltage;
   a first mode driver configured to generate a first switching signal to drive the voltage generator in a first mode;
   a second mode driver configured to generate a second switching signal to drive the voltage generator in a second mode;
   a third mode driver configured to generate a third switching signal to drive the voltage generator in a third mode; and
   a mode controller configured to determine an output load of the voltage generator using the first switching signal, the second switching signal, and the third switching signal, and supply one of the first switching signal, the second switching signal, and the third switching signal to the voltage generator according to the output load.

2. The DC-DC converter according to claim 1, wherein the first mode is a PWM mode, the second mode is a PFM mode, and the third mode is a ULP mode that generates the third switching signal having a frequency lower than that of the second switching signal.

3. The DC-DC converter according to claim 1, further comprising:
   a first switch connected between the first mode driver and the voltage generator and turned on when an enable first control signal is supplied from the mode controller;
   a second switch connected between the second mode driver and the voltage generator and turned on when an enable second control signal is supplied from the mode controller; and
   a third switch connected between the third mode driver and the voltage generator and turned on when an enable third control signal is supplied from the mode controller.

4. The DC-DC converter according to claim 3, wherein the voltage generator comprises:
   an inductor connected between an input terminal to which the input voltage is supplied and an output terminal through which the output voltage is output;
   a first transistor connected between the input terminal and the inductor, turned on in an on-time period of the first switching signal, the second switching signal, or the third switching signal, and turned off in an off-time period;
   a second transistor connected between a ground potential and a common node between the first transistor and the inductor;
   a driver configured to control turn-on and turn-off of the first transistor and the second transistor by receiving one of the first switching signal, the second switching signal, and the third switching signal; and a plurality of resistors connected in series between the output terminal and the ground potential, and wherein a feedback voltage is output from a node between the plurality of resistors.

5. The DC-DC converter according to claim 4, wherein the mode controller comprises:
   an on-time checker configured to check the on-time period of the first switching signal to generate an on-time control signal;
   an off-time checker configured to check the off-time period of the second switching signal to generate an off-time control signal;
   a first counter configured to count the second switching signal to generate a first count signal when the feedback voltage is set to a voltage lower than a reference voltage in the second mode driver; and
   a second counter configured to count the third switching signal to generate a second count signal when the feedback voltage is set to a voltage lower than the reference voltage in the third mode driver.

6. The DC-DC converter according to claim 5, wherein the on-time checker is driven when the voltage generator is driven in the first mode, generates an enable on-time control signal when the on-time period of the first switching signal is greater than or equal to a predetermined time, and generates a disable on-time control signal when the on-time period of the first switching signal is less than the predetermined time.

7. The DC-DC converter according to claim 6, wherein when the enable on-time control signal is generated by the on-time checker, the voltage generator maintains driving of the first mode, and
   when the disable on-time control signal is generated by the on-time checker, the voltage generator is driven in the second mode.

8. The DC-DC converter according to claim 6, wherein the on-time checker comprises:
   a current supply configured to generate a plurality of currents;
   a current controller including a plurality of resistors for distributing the input voltage;
   a current selector configured to control a current amount supplied from the current supply to a first node according to control of the current controller;
   a reset unit configured to initialize the first node in response to an inverted first switching signal; and
   an on-time control signal generator configured to generate the on-time control signal according to a voltage of the first node.

9. The DC-DC converter according to claim 8, wherein the current supply comprises:
   a control transistor connected between a first power source and a current source; and
   a plurality of mirror transistors connected between the first power source and the first node, a gate electrode of each of the plurality of mirror transistors is connected to a gate electrode of the control transistor and supplying the plurality of currents to the current selector.

10. The DC-DC converter according to claim 9, wherein the current controller comprises:
    the plurality of resistors connected in series to distribute the input voltage and generating a plurality of distribution voltages by distributing the input voltage; and
    a plurality of comparators each configured to compare one of the distribution voltages with a comparison voltage and output a control voltage according to a comparison result.

11. The DC-DC converter according to claim 10, wherein the current selector comprises a plurality of current transistors each connected between the first node and one of the mirror transistors, and turned on or turned off by the control voltage, and
    wherein one of the plurality of currents supplied from the current selector is directly supplied to the first node.

12. The DC-DC converter according to claim 8, wherein the reset unit includes a first transistor and a second transistor connected in series between a first power source and the ground potential, and a third transistor connected between the first node and the ground potential, and having a gate electrode connected to a common node of the first transistor and the second transistor,
    wherein the first transistor is a P type transistor, the second transistor is an N type transistor, the third transistor is an N type transistor, and
    wherein the inverted first switching signal is supplied to a gate electrode of the first transistor and a gate electrode of the second transistor.

13. The DC-DC converter according to claim 8, wherein the on-time control signal generator comprises:
    a first capacitor connected between the first node and the ground potential;
    a first transmission gate connected between the first node and a second node;
    a second capacitor connected between the second node and the ground potential;
    a second transmission gate connected between the second node and a third node;
    a third capacitor connected between the third node and the ground potential; and
    a comparator configured to compare voltages of first reference power and the third node to output the on-time control signal.

14. The DC-DC converter according to claim 13, wherein the first transmission gate electrically connects the first node and the second node in response to the first switching signal and the inverted first switching signal, and
    wherein the second transmission gate electrically connects the second node and the third node while being alternately turned on and turned off with the first transmission gate in response to the inverted first switching signal and the first switching signal.

15. The DC-DC converter according to claim 5, wherein the off-time checker is driven when the voltage generator is driven in the second mode, generates an enable off-time control signal when the off-time period of the second switching signal is less than a predetermined time, and generates a disable off-time control signal when the off-time period of the second switching signal is greater than or equal to the predetermined time.

16. The DC-DC converter according to claim 15, wherein when the enable off-time control signal is generated by the off-time checker, the voltage generator maintains driving of the second mode, and
    when the disable off-time control signal is generated by the off-time checker, the voltage generator is driven in the third mode.

17. The DC-DC converter according to claim 15, wherein the off-time checker comprises:
    a current supply configured to supply a predetermined current to a first node;
    a reset unit configured to initialize the first node in response to the first switching signal;
    a controller configured to control a voltage of a second node in response to a voltage of the first node; and a first output unit configured to generate the off-time control signal in response to a voltage of the second node.

18. The DC-DC converter according to claim 17, wherein the current supply comprises:
   a control transistor connected between a first power source and a current source; and
   a mirror transistor connected between the first power source and the first node, a gate electrode of the mirror transistor being connected a gate electrode of the control transistor to supply the predetermined current to the first node.

19. The DC-DC converter according to claim 18, wherein the controller comprises:
   a fourth transistor connected between the second node and the ground potential, and having a gate electrode connected to the first node;
   a fifth transistor connected between the first power source and the second node, and having a gate electrode connected to a gate electrode of the control transistor; and
   a first capacitor connected between the first node and the ground potential.

20. The DC-DC converter according to claim 17, wherein the reset unit comprises:
   a first transistor and a second transistor connected in series between a first power source and the ground potential; and
   a third transistor connected between the first node and the ground potential, and having a gate electrode connected to a common node of the first transistor and the second transistor,
   wherein the first transistor is a P type transistor, the second transistor is an N type transistor, and the third transistor is an N type transistor, and
   wherein the second switching signal is supplied to a gate electrode of the first transistor and a gate electrode of the second transistor.

21. The DC-DC converter according to claim 17, wherein the first output unit comprises:
   a sixth transistor and a seventh transistor connected in series between a first power source and a ground potential, and each having a gate electrode connected to the second node; and
   a D flip-flop having a clock input connected to a common node between the sixth transistor and the seventh transistor,
   wherein a QB terminal of the D flip-flop is connected to a D terminal, a signal output from a Q terminal is the off-time control signal, and
   wherein the sixth transistor is a P type transistor, and the seventh transistor is an N type transistor.

22. The DC-DC converter according to claim 17, wherein the off-time checker further comprises a second output unit generating an on-time change signal in response to a voltage of the first node to control an on-time of the second switching signal.

23. The DC-DC converter according to claim 22, wherein the second output unit comprises:
   a first transmission gate connected between the first node and a fourth node;
   a second capacitor connected between the fourth node and the ground potential;
   a second transmission gate connected between the fourth node and a second output terminal through which the on-time change signal is output; and
   a third capacitor connected between the second output terminal and the ground potential.

24. The DC-DC converter according to claim 5, wherein the first counter is driven when the voltage generator is driven in the second mode,
   wherein the first counter generates a disable first count signal when the feedback voltage is a voltage higher than a reference voltage, and generates an enable first count signal when the feedback voltage is a voltage lower than the reference voltage in the second mode driver and the second switching signal is supplied repeatedly by a predetermined number of times or more.

25. The DC-DC converter according to claim 24, wherein, when the disable first count signal is generated, the voltage generator maintains driving of the second mode, and
   wherein, when the enable first count signal is generated, the voltage generator is driven in the first mode.

26. The DC-DC converter according to claim 24, wherein the first counter comprises:
   a k (k is a natural number) bit counter;
   an output unit configured to generate the enable first count signal when a count signal is input from the k bit counter;
   a first logic gate configured to receive the second control signal and a power signal which is a high voltage when an output voltage of the DC-DC converter is greater than or equal to a target voltage;
   a second logic gate configured to invert an output of the first logic gate; and
   a third logic gate configured to perform a logical operation on an output of the second logic gate and the second switching signal and supply an output to the k bit counter.

27. The DC-DC converter according to claim 26, wherein the first logic gate is a NAND gate, the second logic gate is a NOT gate, the third logic gate is an AND gate, and
   wherein an output of the first logic gate is input to the k bit counter as a reset signal.

28. The DC-DC converter according to claim 26, wherein the output unit is set to a D flip-flop, and the output unit is initialized when a reset signal is supplied from the mode controller.

29. The DC-DC converter according to claim 5, wherein the second counter is driven when the voltage generator is driven in the third mode,
   wherein, when the feedback voltage is a voltage higher than a reference voltage in the third mode driver, a disable second count signal is generated, and
   wherein, when the feedback voltage is a voltage lower than the reference voltage in the third mode driver and the third switching signal is supplied repeatedly for a predetermined number of times or more, an enable second count signal is generated.

30. The DC-DC converter according to claim 29, wherein, when the disable second count signal is generated, the voltage generator maintains driving of the third mode, and
   wherein, when the enable second count signal is generated, the voltage generator is driven in the second mode.

31. The DC-DC converter according to claim 29, wherein the second counter comprises:
   p (p is a natural number) bit counter;
   an output unit configured to generate the enable second count signal when a count signal is input from the p bit counter;

a first logic gate configured to receive the third control signal and a power signal which is a high voltage when an output voltage of the DC-DC converter is greater than or equal to a target voltage;

a second logic gate configured to invert an output of the first logic gate; and a third logic gate configured to perform a logical operation on an output of the second logic gate and the third switching signal to supply an output to the p bit counter.

32. The DC-DC converter according to claim 31, wherein the first logic gate is a NAND gate, the second logic gate is a NOT gate, the third logic gate is an AND gate, and wherein an output of the first logic gate is input to the p bit counter as a reset signal.

33. The DC-DC converter according to claim 31, wherein the output unit is a D flip-flop, and the output unit is initialized when a reset signal is supplied from the mode controller.

34. The DC-DC converter according to claim 5, wherein the mode controller further comprises:

a first logic gate configured to perform a logical operation on the on-time control signal and the first count signal;

a second logic gate configured to perform a logical operation on an output of the first logic gate and an inverted power signal which is a high voltage when a voltage of the DC-DC converter is greater than or equal to a target voltage;

a third logic gate configured to perform a logical operation on an output of the second logic gate and the off-time control signal;

a fourth logic gate configured to perform a logical operation on an output of the third logic gate and the second count signal;

a fifth logic gate configured to perform a logical operation on an inverted off-time control signal and an output of the second logic gate; and a sixth logic gate configured to invert the off-time control signal to generate the inverted off-time control signal.

35. The DC-DC converter according to claim 34, wherein the first logic gate, the second logic gate, and the fourth logic gate are OR gates, the third logic gate and the fifth logic gate are NOR gates, and the sixth logic gate is a NOT gate.

36. The DC-DC converter according to claim 34, wherein the output of the second logic gate is the first control signal, an output of the fourth logic gate is the second control signal, and an output of the fifth logic gate is the third control signal.

37. A display device comprising:

pixels connected to scan lines and data lines; and a power supply including a DC-DC converter to supply driving power required for the pixels, wherein the DC-DC converter comprises:

a voltage generator configured to generate an output voltage by converting an input voltage;

a first mode driver configured to generate a first switching signal to drive the voltage generator in a first mode;

a second mode driver configured to generate a second switching signal to drive the voltage generator in a second mode;

a third mode driver configured to generate a third switching signal to drive the voltage generator in a third mode; and a mode controller configured to determine an output load of the voltage generator using the first switching signal, the second switching signal, and the third switching signal, and supply one of the first switching signal, the second switching signal, and the third switching signal to the voltage generator according to the output load.

* * * * *